(12) United States Patent (10) Patent No.: US 9,164,985 B1
Viswanatha et al. (45) Date of Patent: Oct. 20, 2015

(54) TECHNIQUES FOR DETECTING POOR MACHINE TRANSLATIONS OF KEY TERMS

(75) Inventors: Srinidhi Viswanatha, Bangalore (IN); Pranav Kumar Tiwari, Bangalore (IN); Rajesh S R, Chennai (IN); Avi Dullu, Shivpuri (IN); Vijay Sainath Thadkal, Bengalooru (IN)

(73) Assignee: Google Inc., Mountain View, CA (US)

( * ) Notice: Subject to any disclaimer, the term of this patent is extended or adjusted under 35 U.S.C. 154(b) by 710 days.

(21) Appl. No.: 13/470,835

(22) Filed: May 14, 2012

Related U.S. Application Data

(63) Continuation-in-part of application No. 13/305,852, filed on Nov. 29, 2011.

(51) Int. Cl.
  *G06F 17/28* (2006.01)
(52) U.S. Cl.
  CPC ........ *G06F 17/2854* (2013.01); *G06F 17/2872* (2013.01)
(58) Field of Classification Search
  CPC   G06F 17/289; G06F 17/2854; G06F 17/2872
  See application file for complete search history.

(56) References Cited

U.S. PATENT DOCUMENTS

| 6,996,518 | B2* | 2/2006 | Jones et al. | 704/8 |
| 7,848,915 | B2* | 12/2010 | Gao et al. | 704/2 |
| 8,798,988 | B1* | 8/2014 | Upstill et al. | 704/9 |
| 8,825,467 | B1* | 9/2014 | Chen et al. | 704/2 |
| 2003/0023422 | A1* | 1/2003 | Menezes et al. | 704/2 |
| 2008/0071687 | A1 | 3/2008 | Hengel | |
| 2009/0015373 | A1 | 1/2009 | Kelly et al. | |
| 2009/0024595 | A1* | 1/2009 | Chen | 707/4 |
| 2009/0204386 | A1 | 8/2009 | Seligman et al. | |
| 2009/0319517 | A1 | 12/2009 | Guha et al. | |
| 2010/0299200 | A1 | 11/2010 | Delli Santi et al. | |
| 2011/0087680 | A1 | 4/2011 | Murdock et al. | |
| 2011/0231423 | A1 | 9/2011 | Lopiano | |

OTHER PUBLICATIONS

Somers, Harold. "Round-Trip Translation: What Is It Good for?." Proceedings of the Australasian Language Technology Workshop 2005. pp. 127-133.

* cited by examiner

*Primary Examiner* — Angela A Armstrong
(74) *Attorney, Agent, or Firm* — Foley and Lardner LLP; John D. Lanza

(57) ABSTRACT

Techniques for detecting poor machine translations are disclosed herein. The techniques can include various diagnostics that can be performed to determine whether to adopt a potential translated key term as a translated key term. The diagnostics include a geographic location diagnostic, a reverse translation diagnostic, a local term diagnostic, and a narrow-to-broad diagnostic.

20 Claims, 13 Drawing Sheets

TECHNIQUES FOR DETECTING POOR MACHINE TRANSLATIONS OF KEY TERMS

CROSS-REFERENCE TO RELATED APPLICATIONS

This application is a continuation-in-part of U.S. patent application Ser. No. 13/305,852 filed on Nov. 29, 2011. The entire disclosure of the above application is incorporated herein by reference.

FIELD

The present disclosure generally relates to techniques for detecting poor machine translations of key terms.

BACKGROUND

This section provides background information related to the present disclosure.

On-line advertising has become an effective means to target potential consumers. One form of on-line advertising is advertising in search engines using key terms. A key term may be a phrase including one or more words or strings of characters that a search engine user may include in a query for a particular topic. An advertiser can direct Internet traffic to one or more web pages (called landing pages) using a search engine advertising campaign which utilizes key terms. The advertiser will provide a list of key terms that the advertiser believes a potential customer would enter when looking for a web page that contains subject matter similar to the landing page. For instance, a purveyor of hiking boots could provide a list of key terms to a search engine that includes "hiking boots," "hiking shoes," "trail shoes," and "outdoor gear" such that when a search engine user executes a search using any of the key terms as the search term, an advertisement containing a hyperlink to the landing page of the advertiser is presented to the user.

SUMMARY

This section provides a general summary of the disclosure, and is not a comprehensive disclosure of its full scope or all of its features.

In various embodiments of the present disclosure a computing technique is disclosed. The computing technique includes a user interface module configured to receive a key term including one or more words in a source language and a language determination module configured to determine a target language to which the key term is to be translated. The computing technique further includes a translated key term determination module configured to obtain one or more potential translated keys term by obtaining a translation of the key term from the source language to the target language. The computing technique further includes a geographic location diagnostic module that performs a geographic location diagnostic for each one of the one or more potential translated key terms, the geographic location diagnostic module being configured to: (i) determine whether the key describes a first geographic location, (ii) determine whether the one potential translated key term describes a second geographic location, and (iii) when the key term describes the first geographic location and the one potential translated key term describes the second geographic location, determine whether the second geographic location geospatially corresponds to the first geographic location. The computing technique further includes a narrow-to-broad diagnostic module that performs a narrow-to-broad diagnostic for each one of the one or more potential translated key terms, the narrow-to-broad diagnostic module being configured to: (i) determine a first traffic value corresponding to a first number of search queries containing the key term that are provided to a search engine, (ii) determine a second traffic value corresponding to a second number of total search queries provided to the search engine in the source language, (iii) determine a third traffic value corresponding to a third number of search queries containing the one potential translated key term that are provided to a search engine, (iv) determine a fourth traffic value corresponding to a fourth number of total search queries which were provided to the search engine in the target language, (v) determine a first ratio of the first traffic value to the second traffic value, (vi) determine a second ratio of the third traffic value to the fourth traffic value, and (vii) discard the potential translated key term when the second ratio is greater than the first ratio by more than a predetermined magnitude. The computing technique also includes a local term diagnostic module configured to perform a local term diagnostic for the key term by: (i) determining a first degree of significance of the key term in a first geographic area where the source language is a primary language, (ii) determining a second degree of significance for the key term in one or more other geographic areas where the source language is a primary language, and (iii) comparing the first degree of significance with the second degree of significance. The computing technique further includes a reverse translation diagnostic module that performs a reverse translation diagnostic, the reverse translation diagnostic module being configured to: (i) obtain one or more reverse translations of the one or more potential translated key terms from the target language to the source language, (ii) compare each one of the one or more reverse translations with the key term, and (iii) when at least one of the reverse translations match the key term, discard the potential translated key terms having reverse translations that do not match the key term. The key term determination module is further configured to selectively adopt, for each one of the one or more potential translated key terms, the one potential translated key term as a translated key term based on the geographic location diagnostic, the narrow-to-broad diagnostic, the local term diagnostic, and the reverse translation diagnostic.

In various embodiments of the present disclosure, a computer-implemented technique for verifying machine translations is disclosed. The technique includes receiving, at a computing device having one or more processors, a key term including one or more words in a source language, determining, at the computing device, a target language to which the key term is to be translated, and obtaining, at the computing device, one or more potential translated keys terms by obtaining a machine translation of the key term from the source language to the target language. The technique also includes determining, at the computing device, whether to adopt any of the one or more potential translated key terms as a translated key term by performing, at a geographic location diagnostic module, a geographic location diagnostic for each one of the one or more potential translated key terms by: (i) determining whether the key term describes a first geographic location, (ii) determining whether the one potential translated key term describes a second geographic location, and (iii) when the key term describes the first geographic location and the one potential translated key term describes the second geographic location, determining whether the second geographic location geospatially corresponds to the first geographic location. The determining whether to adopt the any of the one or more potential translated key terms as translated key terms is further achieved by performing, at a narrow-to-broad diagnostic module, a narrow-to-broad diagnostic for each one of the one or more potential translated key terms by determining whether the key term is more narrowly defined than the one potential translated key term, performing, at a local term diagnostic module, a local term diagnostic for the key term by: (i) determining a first degree of significance of the key term in a first geographic area where the source language is a primary language, (ii) determining a second degree of significance for the key term in one or more other geographic areas where the source language is a primary language, and (iii) comparing the first degree of significance with the second degree of significance. The determining whether to adopt the any of the one or more potential translated key terms as translated key terms is further achieved by, for each one of the one or more potential translated key terms, selectively adopting the one potential translated key term as an acceptable translation based on the geographic location diagnostic, the narrow-to-broad diagnostic, and the local term diagnostic.

According to some embodiments of the present disclosure determining whether the key term is more narrowly defined than the one potential translated key term further includes determining a first traffic value corresponding to a first number of search queries which contain the key term in the source language that were provided on a search engine, determining a second traffic value corresponding to a second number of total search queries provided to the search engine in the source language, determining a third traffic value corresponding to a third number of search queries which contain the one potential translated key term that were provided to search engine, determining a fourth traffic value corresponding to a fourth number of total search queries which were provided to the search engine in the target language, and determining whether to discard the one potential key term based on the first traffic value, the second traffic value, the third traffic value, and the fourth traffic value.

In some embodiments of the present disclosure, the computer-implemented method further includes determining a first ratio of the first traffic value to the second traffic value and a second ratio of the third traffic value to the fourth traffic value.

In some embodiments of the present disclosure, the computer-implemented method further includes discarding the potential translated key term when the second ratio is greater than the first ratio by more than a predetermined magnitude.

In some embodiments of the present disclosure, determining whether to adopt any of the one or more potential translated key terms as the translated key term further includes performing, at a reverse translation diagnostic module, a reverse translation diagnostic by: obtaining one or more reverse translations of the one or more potential translated key terms from the target language to the source language, and comparing each one of the one or more reverse translations with the key term. When at least one of the reverse translations match the key term, the computer-implemented method includes discarding any of the potential translated key terms having reverse translations that do not match the key term.

In some embodiments of the present disclosure, when none of the reverse translations match the key term, the computer-implemented method further includes discarding none of the potential translated key terms.

In some embodiments of the present disclosure the one potential translated key term is selectively adopted as the acceptable translation when the second geographic location geospatially corresponds to the first geographic location.

In some embodiments of the present disclosure the second geographic location geospatially corresponds to the first geographic location when the second geographic location and the first geographic location overlap.

In some embodiments of the present disclosure the local term diagnostic includes: determining the first degree of significance by determining a first ratio of a first number of search queries containing the key term and originating from the first geographic area to a second number of search queries containing any terms and originating from the first geographic area, and determining the second degree of significance by determining a second ratio of a third number of search queries containing the key term and originating from the one or more other geographic areas to a fourth number of search queries containing any terms and originating from the one or more other geographic areas.

In some embodiments of the present disclosure the key term is determined to be locally significant to the first geographic area when the first ratio is greater than the second ratio by a predetermined magnitude.

In various embodiments of the present disclosure, a computing technique is disclosed. The technique includes a user interface module configured to receive a key term including one or more words in a source language, a language determination module configured to determine a target language to which the key term is to be translated, and a translated key term determination module configured to obtain one or more potential translated keys term by obtaining a translation of the key term from the source language to the target language. The technique further includes a geographic location diagnostic module configured to perform a geographic location diagnostic for each one of the one or more potential translated key terms by: (i) determining whether the key describes a first geographic location, (ii) determining whether the one potential translated key term describes a second geographic location, and (iii) when the key term describes the first geographic location and the one potential translated key term describes the second geographic location, determining whether the second geographic location geospatially corresponds to the first geographic location. The technique further includes a narrow-to-broad diagnostic module configured to perform a narrow-to-broad diagnostic for each one of the one or more potential translated key terms by determining whether the key term is more narrowly defined than the one potential translated key term. The technique also includes a local term diagnostic module configured to perform a local term diagnostic for the key term by: (i) determining a first degree of significance of the key term in a first geographic area where the source language is a primary language, (ii) determining a second degree of significance for the key term in one or more other geographic areas where the source language is a primary language, and (iii) comparing the first degree of significance with the second degree of significance. The key term determination module is further configured to selectively adopt, for each one of the one or more potential translated key terms, the one potential translated key term as a translated key term based on the geographic location diagnostic, the narrow-to-broad diagnostic, and the local term diagnostic.

In some embodiments of the present disclosure, the narrow-to-broad diagnostic module is further configured to determine a first traffic value corresponding to a first number of search queries containing the key term that are provided to a search engine, determine a second traffic value corresponding to a second number of total search queries provided to the search engine in the source language, determine a third traffic value corresponding to a third number of search queries containing the one potential translated key term that are provided to a search engine, determine a fourth traffic value corresponding to a fourth number of total search queries which were provided to the search engine in the target language, and determine whether to discard the one potential key term based on the first traffic value, the second traffic value, the third traffic value, and the fourth traffic value.

In some embodiments of the present disclosure, the narrow-to-broad diagnostic module is further configured to determine a first ratio of the first traffic value to the second traffic value and a second ratio of the third traffic value to the fourth traffic value and to discard the potential translated key term when the second ratio is greater than the first ratio by more than a predetermined magnitude.

In some embodiments of the present disclosure, the computing technique further includes a reverse translation diagnostic module that performs a reverse translation diagnostic, the reverse translation diagnostic module being configured to: (i) obtain one or more reverse translations of the one or more potential translated key terms from the target language to the source language, (ii) compare each one of the one or more reverse translations with the key term, and (iii) when at least one of the reverse translations match the key term, discard the potential translated key terms having reverse translations that do not match the key term.

In some embodiments of the present disclosure the reverse translation diagnostic module is configured to discard none of the potential translated key terms when none of the reverse translations match the key term.

In some embodiments of the present disclosure, the geographic location diagnostic module is configured to determine that the second geographic location geospatially corresponds to the first geographic location when the second geographic location and the first geographic location overlap.

In some embodiments of the present disclosure, the geographic location diagnostic module discards the one potential translated key term when the second geographic location does not geospatially correspond to the first geographic location.

In some embodiments of the present disclosure, the local term diagnostic module is configured to: determine the first degree of significance by determining a first ratio of a first number of search queries containing the key term and originating from the first geographic area to a second number of search queries containing any terms and originating from the first geographic area, and determine the second degree of significance by determining a second ratio of a third number of search queries containing the key term and originating from the one or more other geographic areas to a fourth number of search queries containing any terms and originating from the one or more other geographic areas.

In some embodiments of the present disclosure, the local term diagnostic module is configured to determine that a key term is locally significant to the first region when the first ratio is greater than the second ratio by more than a predetermined magnitude.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
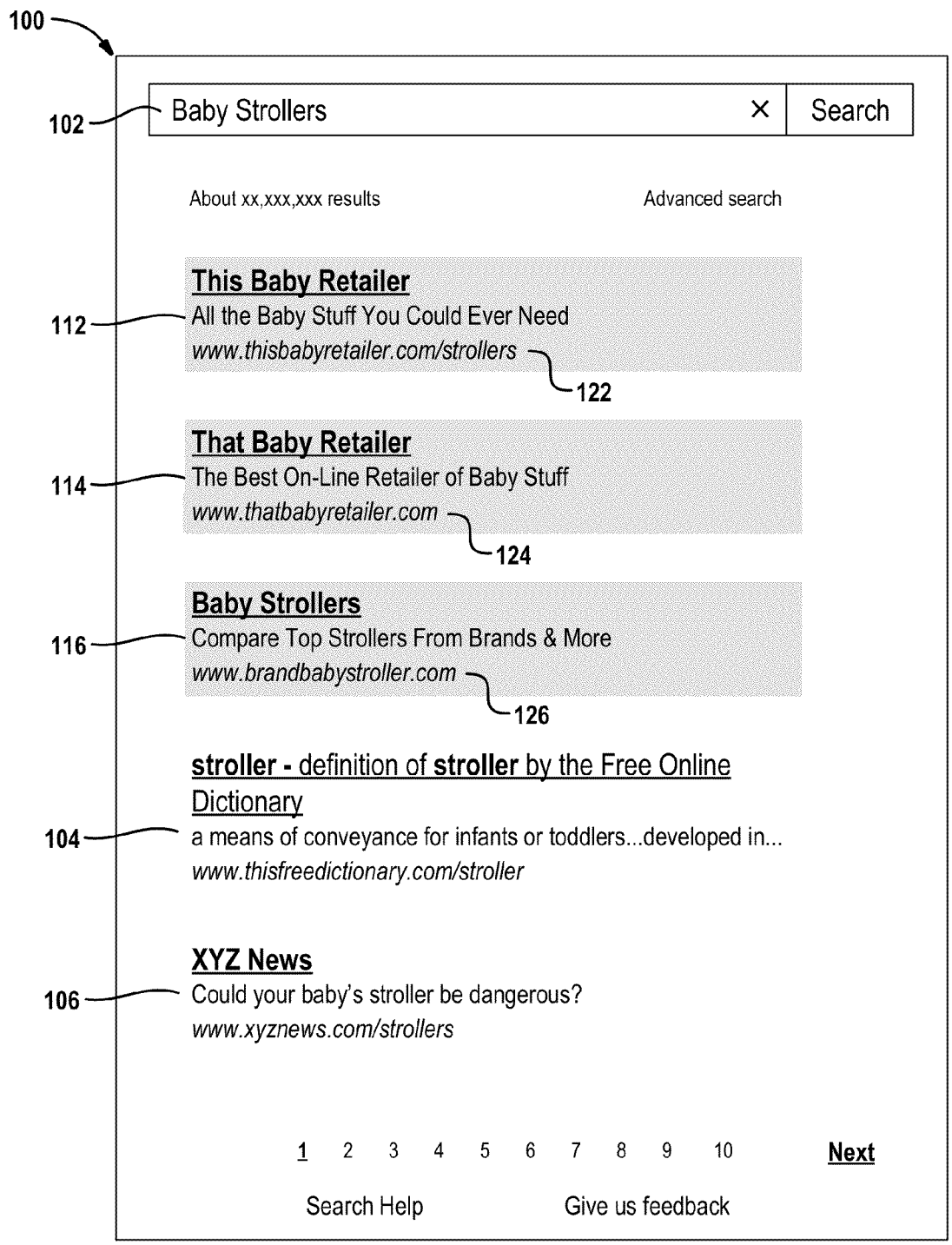
FIG. 1 is a drawing illustrating an example of a screen shot of a search performed on a search engine.

FIG. 1 illustrates an example of a screen 100 that is presented by a search engine for display at a user terminal. In this example, a user has entered the search query "baby strollers" in a search query field 102. A search query may include one or more words or strings of characters that a user may provide to a search engine. The search engine may be configured to provide search results in response to the search query. In the illustrated example, the search results 104 and 106 can be displayed at the bottom portion of the screen 100. Above the search results 104 and 106, a first advertising creative 112, a second advertising creative 114 and a third advertising creative 116 can be displayed. The advertising creatives 112, 114 and 116 may be retrieved by the search engine based on the received search query. The advertising creatives 112, 114 and 116 contain hyperlinks 122, 124, and 126, respectively, that link to the respective advertiser's web page. The user can click on a hyperlink 122, 124, and 126 in one of the advertising creatives 112, 114, and 116 to be directed to a web page of the advertiser. The web page to which the user is directed to may sometimes be referred to as a "landing page."

As can be appreciated, the foregoing framework for advertising a web page may be an efficient means of attracting users, e.g., potential consumers, to the webpage, as the advertising creatives 112, 114 and 116 are presented to a user based on the search query entered by the potential consumer. An advertiser can utilize an advertising campaign that is designed to attract potential consumers to the advertiser's web page.

An advertising campaign may include a set of key terms that the advertiser registers with the search engine, one or more advertising creatives 112, and one or more hyperlinks 122 to one or more landing pages to which the advertising campaign is directed. The key terms can be conceptually related to the content of the advertiser's landing page. Each key term can be comprised of one or more words or strings of characters. When a search engine user enters a search query containing the key term, the search engine can retrieve one or more advertising creatives 112, 114 and 116 corresponding to the entered key term, which may be provided for display at a user terminal of the user. Thus, a key term may be thought of as a hypothetical search query that a user may provide to a search engine when searching for a particular subject matter or web page.

As discussed, an advertiser may register one or more key terms at a search engine as part of the advertiser's advertising campaign. Typically, the advertiser can register a key term or advertising campaign for search engine queries originating from a specific geographic area. A geographic area can be a country, a state, a municipality, or any other geographically distinct region. For example, in the illustrated example provided above, an advertiser may register the key term "baby strollers" for searches originating from the United States. On-line advertisers may desire to expand their market reaching into other geographic areas.

Figure 2:
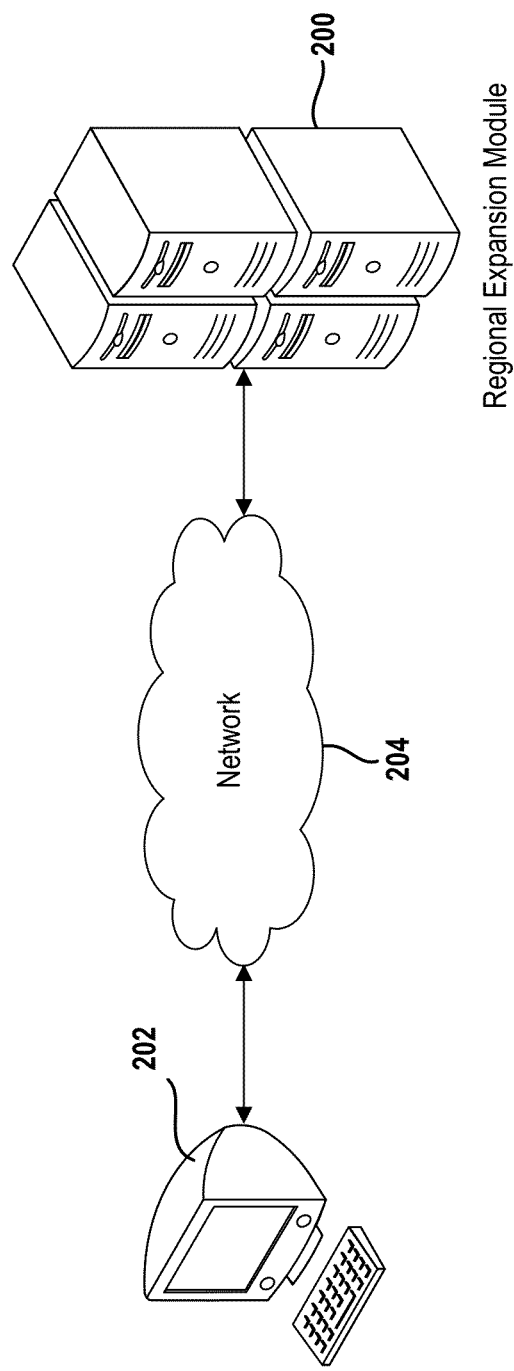
FIG. 2 is a drawing illustrating an example environment of a regional expansion module according to some embodiments of the present disclosure.

FIG. 2 illustrates an example environment for assisting advertisers to expand their advertising campaigns to new geographic areas. The environment can include a regional expansion module 200 that communicates with one or more user terminals 202 over a communication network 204. The regional expansion module 200 can be one or more servers. The user terminal 202 can be any type of computing device, including but not limited to, a computer, a laptop computer, a smart phone, a mobile telephone, a PDA, a tablet PC, or any other device operable to communicate with the regional expansion module 200. A user can provide the regional expansion module 200 with one or more key terms and a potential market selection indicating one or more potential geographic areas in which to advertise. The regional expansion module 200 determines a market suggestion indicating one or more geographic areas from the potential market selection to suggest to the advertiser as being desirable to advertise in based on the received key terms.

The foregoing environment for the regional expansion module 200 is an example, and variations thereof are contemplated. For instance, in some environments the regional expansion module 200 can execute on the user terminal 202 as an offline or an online tool. Furthermore, the regional expansion module 200 can be implemented as an application programming interface (API) to suggest geographic areas to an advertiser based on certain key terms that are provided as part of an advertising campaign.

Figure 3:
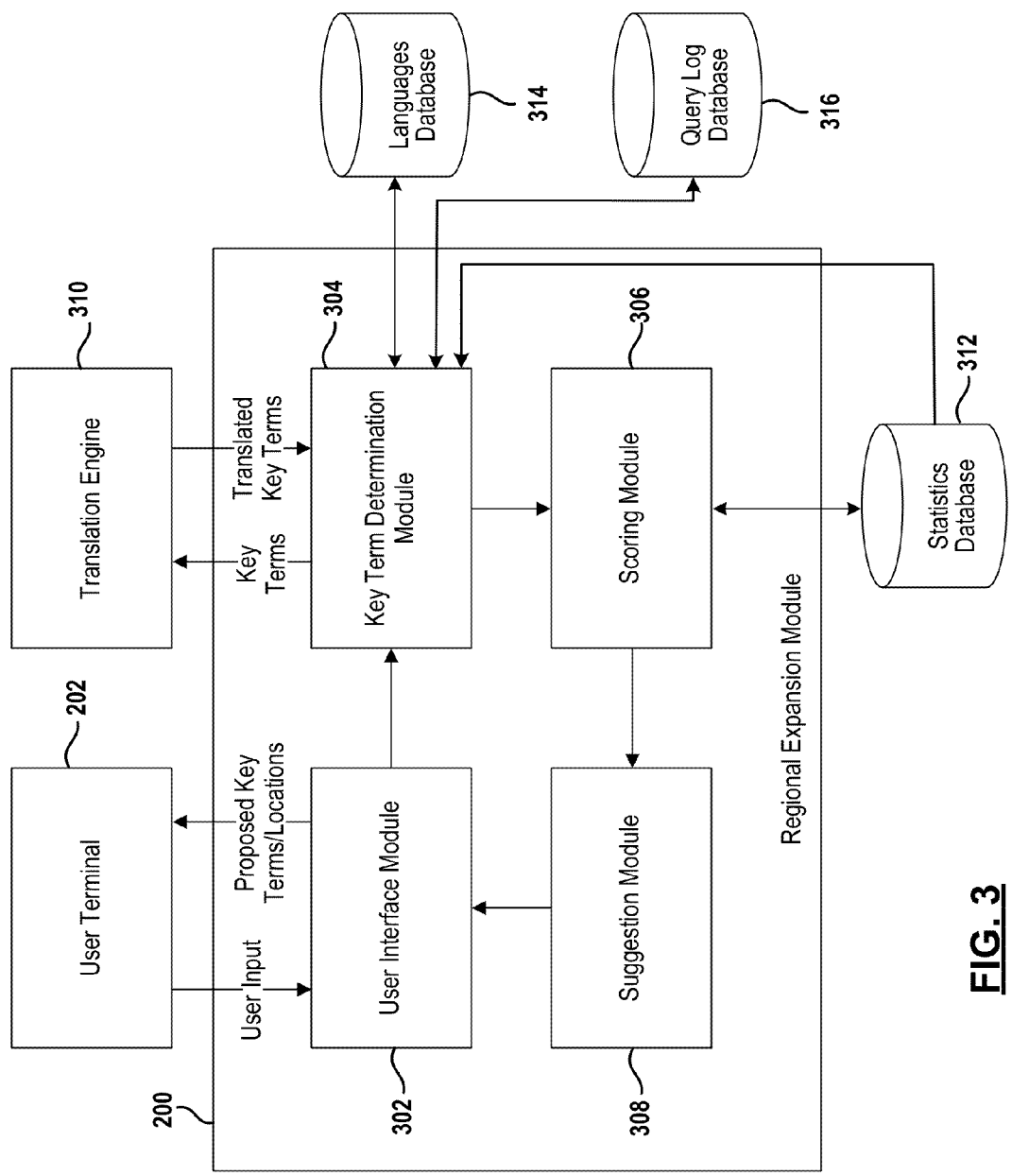
FIG. 3 is a block diagram illustrating example components of a regional expansion module according to some embodiments of the present disclosure.

FIG. 3 illustrates example components of a regional expansion module 200. The regional expansion module 200 can include, but is not limited to, a user interface module 302, a key term determination module 304, a scoring module 306, and a suggestion module 308. It is appreciated that the regional expansion module 200 may further include or may be in communication with a translation engine 310, a statistics database 312, a languages database 314, and/or a query log database 316. The foregoing components are provided as an example and the regional expansion module 200 may include additional or alternative components.

The user interface module 302 provides, for display at the user terminal 202, an interface for a user, e.g., a potential advertiser, to interact with the regional expansion module 200. The user interface module 302 can present a screen or multiple screens that allow the user to provide one or more key terms, a preexisting advertising campaign, and a potential market selection to the regional expansion module 200 for analysis. The potential market selection indicates N geographic areas, where N is an integer greater than or equal to 1. For example, if the potential market selection is Europe, the geographic areas can include Spain, United Kingdom, France, Germany, Russia, etc.

Figure 4:
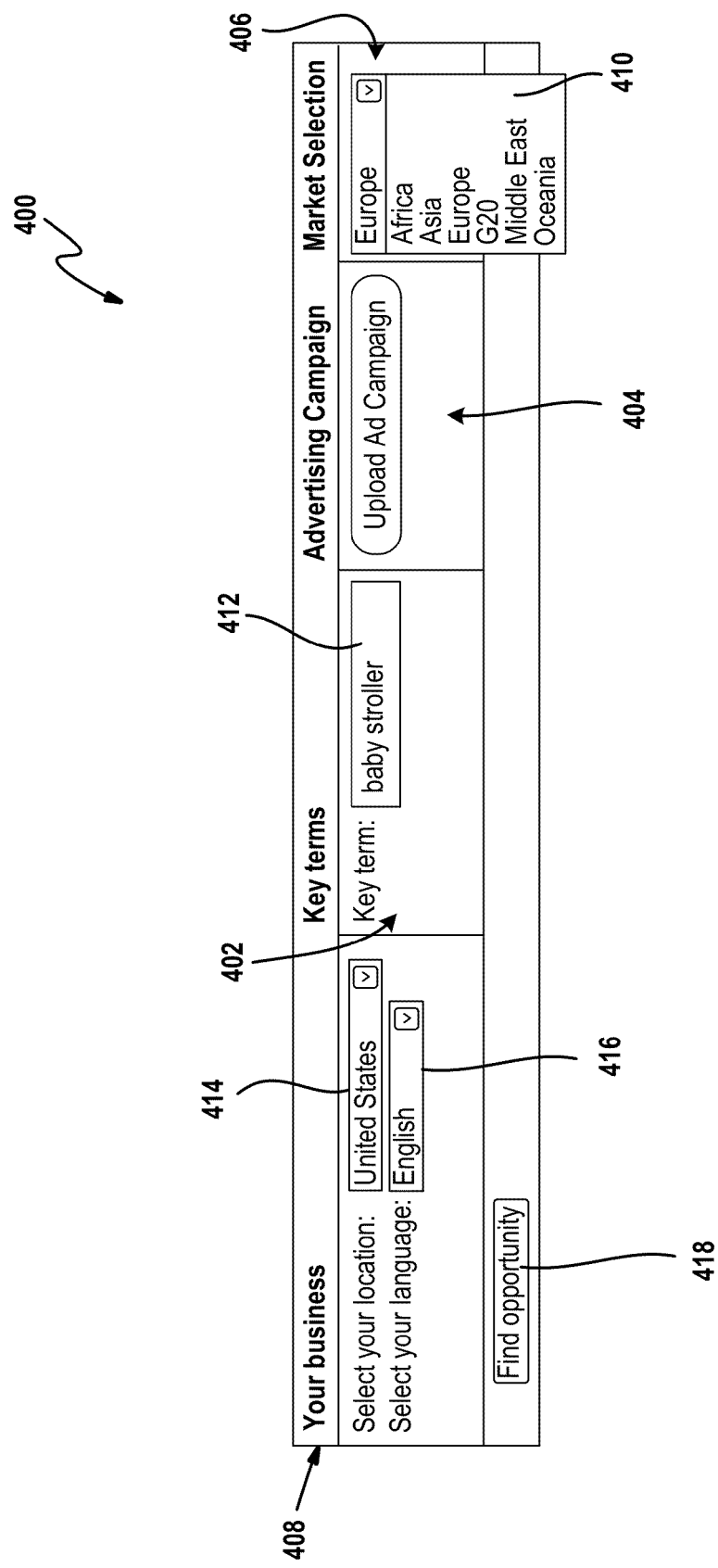
FIG. 4 is a drawing illustrating an example screen that may be presented for display at a user terminal by a regional expansion module according to some embodiments of the present disclosure.

FIG. 4 illustrates an exemplary screen 400 that can be provided by the user interface module 302 for display at a user terminal 202. In the example, the user is provided with a key term input area 402, an advertising campaign input area 404, a potential market selection area 406, and a current market selection area 408.

The key term input area 402 allows a user to provide one or more potential key terms that are to be analyzed by the regional expansion module 200. For example, the user can enter the potential key term "baby stroller" into a text box 412 located in the key term input area 402.

The advertising campaign input area 404 allows a user to provide a preexisting advertising campaign that is to be analyzed by the regional expansion module 200. It is appreciated that a preexisting advertising campaign may be stored at the user terminal 202 or at a remote storage device having a network address, e.g. a file server. The user can enter the location of the preexisting advertising campaign in the advertising campaign input area 404. For example, the user can provide a file path indicating the location of the advertising campaign in the file system of the user terminal 202, or can provide network address indicating the location of the advertising campaign at the remote storage device.

The potential market selection area 406 allows a user to provide the potential market selection. As mentioned, the potential market selection can indicate one or more geographic areas that are to be analyzed for potential advertising opportunities. In the example, the potential market selection area 406 provides a first drop-down menu 410 where the user can provide a potential market selection. A potential market selection may be a continent, e.g., Europe, Asia; a region, e.g., Middle East; or any other collection of geographic areas, e.g., G20 countries and emerging markets. The potential market selection may also be all of the countries of the world or a single country. It is appreciated, that the foregoing is an example of a potential market selection area 406, and other mechanisms for providing a potential market selection are within the scope of the disclosure.

The current market selection area 408 allows a user to provide current market information, such as a geographic area where the user is currently advertising, and a source language of the one or more key terms provided in the key term input area 402. In the illustrated example, the current market selection area 408 provides a second drop-down menu 414 that allows a user to select a current geographic area and a third drop-down menu 416 that allows a user to select a source language of the one or more key terms provided.

As can be appreciated, the user can provide information such as a key term, an advertising campaign, a potential market selection, and/or current market information using the screen 400 presented by the user interface module 302. Upon entering the key term, the potential market selection, and/or the current market information, the user can click on a "find opportunity" icon 418, to transmit the provided information to the regional expansion module 200. It should be appreciated that the information can be provided in any other suitable manner. The user terminal 202 can transmit the information over the communication network 204 to the user interface module 302 of the regional expansion module 200. The user interface module 302 can provide the received information to the key term determination module 304. It should be appreciated that the foregoing screen 400 is provided for example only and is not intended to be limiting.

Referring again to FIG. 3, the key term determination module 304 can receive the one or more potential key terms and/or the preexisting advertising campaign, as well as the potential market selection indicating one or more geographic areas. Further the key term determination module 304 can receive the current market information, such as a source language of the key term and a current market in which the key term is utilized.

The key term determination module 304 determines a plurality of key terms that are to be analyzed by the regional expansion module 200. The key term determination module 304 can extract the plurality of key terms from the one or more potential key terms and/or the preexisting advertising campaign. The key term determination module 304 can include some or all of the potential key terms provided by the user in the plurality of key terms that are to be analyzed by the regional expansion module 200. Similarly, the received advertising campaign may include one or more campaign key terms, e.g., the key terms extracted from the advertising campaign. The key term determination module 304 may also include the campaign key terms in the plurality of key terms.

The key term determination module 304 can be further configured to extract additional key terms from the advertising creative of the advertising campaign and/or the website that is linked to by the advertising campaign. It should be appreciated that an advertising creative may include a text portion and a hyperlink to a website. The key term determination module 304 can parse the advertising creative to identify words or strings of words that could be used as key term, which are referred to as possible key terms.

The key term determination module 304 can also parse the advertising creative to identify a hyperlink that links to the webpage to which the advertising campaign is directed. The key term determination module 304 can receive website data representing the website, e.g., HTML code. The key term determination module 304 can parse the website data to identify text that is displayed in the website. From the identified text, the key term determination module 304 can identify words or strings of words that could be used as key terms, which are referred to as possible key terms.

The key term determination module 304, for each possible key term identified in the text portion of the advertising creative and the website corresponding to the hyperlink, can determine whether to include the possible key term in the plurality of key terms to be analyzed. It is appreciated that the key term determination module 304 may make this determination in any suitable manner. For instance, the key term determination module 304 may query a query log database 316 to determine whether a possible key term is to be included in the plurality of key terms. It is noted that the query log database 316 may be a component of the regional expansion module 200 or may be located at a different location or server. The key term determination module 304 may access the query log database 316 via a network, such as an intranet or the Internet. The query log database 316 is a database that stores a representative sampling of search queries provided to one or more search engines, as well as web pages that have been accessed as a result of the search query. It is noted that the query log database 316 may only include commercial searches, and may exclude private or non-commercial search queries and results, thereby protecting the privacy of a search engine user. Further, the query log database 316 can also store search queries anonymously, to further protect the privacy of a search engine user.

The key term determination module 304 can provide each possible key term to the query log database 316 to determine which of the possible key terms can be considered legitimate search queries. If the possible key term has been used as a search query in more than a nominal amount of searches, then the possible key term may be included in the plurality of key terms to be analyzed. If the possible key term has not been used as a search query or has only been used a nominal amount of times as a search query, then the possible key term can be disregarded. It is appreciated that the foregoing technique for determining whether potential key terms should be included in the plurality of key terms to be analyzed is provided for example only. Other techniques can be implemented and are within the scope of this disclosure.

For each one of the one or more geographic areas indicated in the potential market selection, the key term determination module 304 can be further configured to determine one or more pertinent languages of the geographic area. In some embodiments, the key term determination module 304 can obtain the one or more pertinent languages of a geographic area from a languages database 314. The languages database 314 can store pertinent languages of a plurality of different geographic areas.

The pertinent languages of a geographic area can be based upon any suitable metric. In some embodiments, the pertinent languages of a geographic area can be based upon the amount of total search engine queries that originate from the geographic area in a particular language. For example, if 100,000 search engine queries originate from the particular geographic area, and 50,000 search queries are in English, 25,000 are in French, 20,000 are in Dutch, 4,000 are in Flemish, and the rest of the search engine queries are in various other languages, the pertinent languages of the geographic area may be English, French, Dutch, and Flemish, but not any of the various other languages. In this example, a language is considered a pertinent language of a particular geographic area if the amount of searches originating from the particular geographic area in the language in relation to the total amount of searches originating from the particular geographic area in any language is greater than a predetermined threshold, e.g., 5%. If the total amount of searches is greater than the predetermined threshold, then the language is considered a pertinent language of a geographic area. Other means for determining the pertinent languages of a geographic area are further considered and are within the scope of the disclosure.

Upon determining the pertinent languages of a geographic area, the key term determination module 304 can translate each key term from the source language to each of the pertinent languages of a geographic area, thereby obtaining a plurality of translated key terms in each of the pertinent languages of the geographic area. In some embodiments, the key term determination module 304 provides the plurality of key terms to a translation engine 310 that translates the key terms from a source language to a target language. Thus, the key term determination module 304 can further provide the source language of the plurality of key terms and the pertinent language to which the plurality of key terms are being translated. The translation engine 310 may perform a machine translation of the plurality of key terms and return a plurality of translated key terms in the pertinent language.

The translation engine 310 can return a plurality of translated key terms in a pertinent language to the key term determination module 304. In some embodiments, the plurality of translated key terms can be analyzed to determine whether each of the plurality of translated key terms are appropriate translations. In some scenarios, the translation engine 310 may return a translation that is too broad. For example, the key term "laptop bag" translated from English to Russian, may result in a translated key term "сумка," meaning "bag." In these scenarios, the key term determination module 304 may be configured to discard overly broad translated key terms. It is appreciated that the translated key terms may be analyzed for other deficiencies in the machine translation provided by the translation engine 310, such as an inaccurate geographic translation or an overly narrow translation.

It should be appreciated that the key term determination module 304 can obtain translations of key terms in any other suitable manner. For instance, the key term determination module 304 may be configured to perform machine translation of key terms using techniques now known or later developed. It should further be appreciated that the key term determination module 304 obtains a plurality of translated key terms for each pertinent language for each of the one or more geographic areas. Either prior to translating a key term or after a translated key term is received, techniques such as removing the stop words, e.g., "a," "an," and, "the", from either the key term or the translated key term may be performed by the key term determination module 304. The key term determination module 304 can provide the plurality of translated key terms to the scoring module 306. The key term determination module 304 may further provide the geographic area to which a plurality of translated key terms corresponds.

The scoring module 306 receives a plurality of translated key terms and the geographic area to which the translated key terms correspond. For instance, if the key terms "baby stroller" and "infant stroller" translate to "kinderwagen" and "kleinkindz kinderwagen," respectively, in German, and the geographic area being analyzed is Germany, the scoring module 306 can receive the plurality of translated key terms, e.g., "kinderwagen" and "kleinkind kinderwagen," and a geographic area indicator, e.g., "Germany." For each one of the plurality of translated key terms, the scoring module 306 determines advertising statistics for the translated key terms in the geographic area. In some embodiments, the scoring module 306 may retrieve advertising statistics for a particular translated key term from the statistics database 312. The statistics database 312 stores the advertising statistics for a plurality of key terms in a plurality of different languages for a plurality of different geographic areas. The advertising statistics of a translated key term may be indicative of a traffic value of the translated key term in the geographic area, a cost value of the translated key term in the geographic area, a click-through rate of the translated key term, and a competition value for the translated key term in the geographic area.

The traffic value of a translated key term can correspond to a number of search queries containing the translated key term that originated from the one geographic area and were provided to a search engine during a predetermined period of time. For example, the traffic value may be indicative of an average amount of monthly search queries containing the translated key term that were provided to a search engine from the geographic area.

The cost value of a translated key term can correspond to a price associated with utilizing the translated key term in a search engine advertising campaign for the geographic area. For example, the cost value may indicate a cost-per-click for the translated key term in the geographic area, e.g., an amount of money the advertiser must pay each time the advertising creative is displayed and the hyperlink contained therein is clicked by a user.

The click-through rate of a translated key term corresponds to a number of instances where an advertisement is presented to one or more search engine users in response to a search query originating from the one geographic area and containing the translated key term in relation to a number of instances where the one or more search engine users click on a hyperlink associated with the advertisement. In some embodiments, the click-through rate of a translated key term is defined by:

$$CTR_{TKT} = \frac{Clicks_{TKT}}{Displays_{TKT}}$$

where $CTR_{TKT}$ is the click-through rate of a translated key term, $Displays_{TKT}$ is the amount of times an advertising creative is displayed to one or more search engine users in response to a search engine query containing the translated key term, and $Clicks_{TKT}$ is the amount of times the one or more users clicked on the hyperlink. For example, if an advertising creative is presented to search engine users 10 times in response to a search engine user providing a search engine query containing a particular translated key term, and the search engine user clicked on the hyperlink of the advertising campaign 5 times, the click-through rate may be 0.50.

The competition value of a translated key term can correspond to a number of entities that have registered the translated key term in other advertising campaigns directed to the geographic area. The competition value can be normalized, such that the amount of competition can be represented on a scale of, for example only, 0-1 or 0-100. For example, if a maximum amount of competition for a particular key term is 100 advertisers, and currently 90 advertisers have registered the particular key term in other advertising campaigns, the competition value may be 90/100 or 0.9.

For each pertinent language of a geographic area, the scoring module 306 can determine a term-specific score for each translated key term of corresponding to the pertinent language. The scoring module can determine the term-specific score of a translated key term based on the advertising statistics of the translated key term. A term-specific score of a translated key term may be indicative of a degree of desirability of using the translated key term in a search engine advertising campaign in the geographic area. In some embodiments, the term-specific score is based on the advertising statistics of the translated key term in the geographic area. For example, the term-specific score of a translated key term may be determined using the following formula:

$$Score_{TKT} = \frac{Traffic_{TKT} * CTR_{TKT}}{Cost_{TKT}}$$

where $Score_{TKT}$ is the term-specific score of the translated key term in the geographic area, where $Traffic_{TKT}$ is the traffic value of the translated key term in the geographic area, $CTR_{TKT}$ is the click-through rate of the translated key term in the geographic area, and $Cost_{TKT}$ is the cost value of the translated key term in the geographic area It is appreciated that the term-specific score can be determined using other formulas or metric. For example, in some embodiments, the term-specific score of a translated key term may be determined using the following formula:

$$\text{Score}_{TKT} = \frac{\text{Traffic}_{TKT}}{\text{Competition}_{TKT}} * \frac{\sqrt{\text{Traffic}_{TKT}}}{\text{Cost}_{TKT}}$$

where Score$_{TKT}$ is the term-specific score of the translated key term in the geographic area, where Traffic$_{TKT}$ is the traffic value of the translated key term in the geographic area, Competition$_{TKT}$ is the competition value of the translated key term in the geographic area, and Cost$_{TKT}$ is the cost value of the translated key term in the geographic area.

As previously indicated, in some pertinent languages, a key term may translate to multiple translated key terms. In these scenarios, the scoring module 306 can score the multiple translated key terms in the pertinent language individually.

The scoring module 306 can determine term-specific scores of the plurality of translated key terms for each pertinent language of each of the geographic areas. Furthermore, for each of the geographic areas, the scoring module 306 can generate a language-specific score for each pertinent language of the geographic area, and an area-specific score for each of the geographic areas. For example, if the geographic area is Germany, and the pertinent languages are English, German, Russian, and Spanish, the scoring module 306 may generate language-specific scores for each pertinent language, e.g., the language-specific score of German with respect to Germany can be obtained by averaging the term-specific scores of all the translated key terms in German. Further, the scoring module 306 can generate an area-specific score for Germany by, for example, averaging the language-specific scores of each pertinent language of Germany or by averaging the term-specific scores of all the translated key terms corresponding to Germany.

The suggestion module 308 can determine a market suggestion indicating one or more of the geographic areas in the market selection. For each of the one or more geographic areas, the suggestion module 308 can determine whether to include the geographic area in the market suggestion based on the term-specific scores corresponding to the geographic area, the language-specific scores corresponding to the geographic area, and/or the area-specific score of the geographic area. In some embodiments, the suggestion module 308 sorts or ranks the geographic areas in accordance with the area-specific scores of the geographic areas. The suggestion module 308 can suggest geographic areas to the user based on the rankings of the geographic areas. For example, the suggestion module 308 may suggest the top five or ten geographic areas. In some embodiments, the suggestion module 308 can suggest any geographic area having a score above a threshold.

It is appreciated that the suggestion module 308 can further rank the pertinent languages of a geographic area in accordance with the language-specific scores of the pertinent languages. For each geographic area, the suggestion module 308 may select one or more pertinent languages to suggest for advertising based on the rankings of the pertinent languages with respect to their geographic area. For example, if the pertinent languages of a geographic area are English, Spanish, and Arabic, and the language-specific scores of English and Spanish are relatively high, but the language-specific score of Arabic is relatively low, the suggestion module 308 may suggest to the user to advertise in English and Spanish, but not in Arabic. It is appreciated that the suggestion module 308 may select the highest ranked pertinent languages, e.g., the top four pertinent languages, or may select any pertinent language with a language-specific score above a predetermined threshold.

Similarly, for each pertinent language of a geographic area, the plurality of translated key terms corresponding thereto may be ranked in accordance with their respective term-specific scores. For each pertinent language, the suggestion module 308 may select one or more translated key terms corresponding to the pertinent languages to suggest for inclusion in an advertising campaign based on the rankings of the translated key terms with respect to their pertinent language. For example, if the translated key terms in English include a first translated key term, a second translated key term, and a third translated key term, and the term-specific scores of the first translated key term and the second translated key term are relatively high, but the term-specific score of the third translated key term is relatively low, the suggestion module 308 may suggest to the user to use the first and second translated key terms in an advertising campaign but not the third translated key term. It is appreciated that the suggestion module 308 may select the highest ranked translated key terms, e.g., the top five translated key terms, or may select any translated key term with a term-specific score above a predetermined threshold.

The suggestion module 308 can provide the market selection of the user interface module 302 for display at a user terminal 202. For each geographic area, the suggestion module 308 may further provide the pertinent languages and/or the translated key terms that have been selected for inclusion in the market suggestion. The user interface module 302 can receive the geographic areas, pertinent languages, and translated key terms that have been selected for suggestion and generates a screen that is presented for display at the user terminal 202. The screen that is presented for display may indicate the geographic areas included in the market suggestion, the pertinent languages of the geographic areas of the market suggestion, and the translated key terms in each of the pertinent languages. Further, advertising statistics corresponding to the geographic areas selected for suggestion, the pertinent languages of the geographic areas selected for suggestion, and the translated key terms can also be provided for display at the user terminal.

Figure 5A:
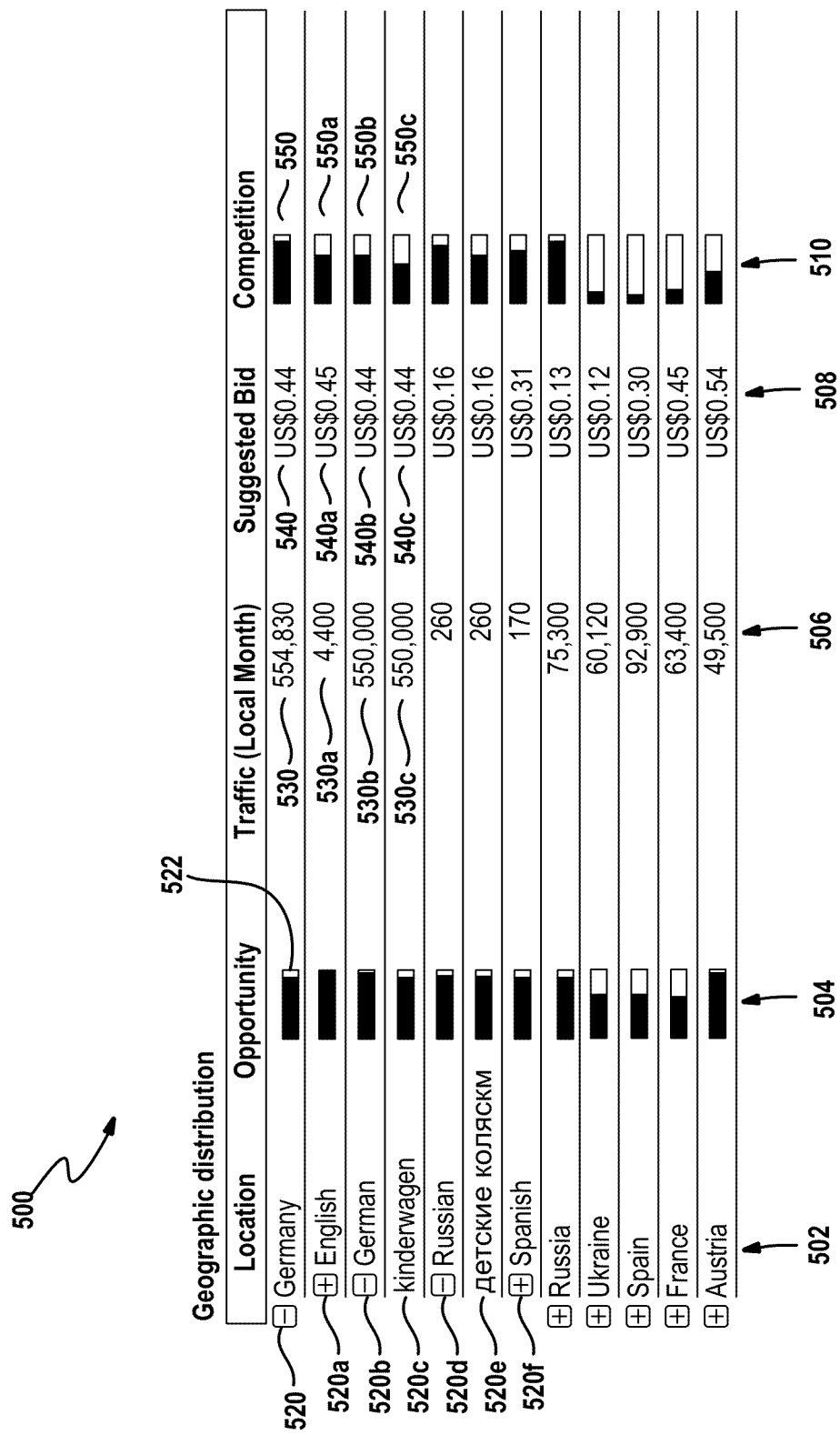
FIGS. 5A and 5B are drawings illustrating example screens that may be presented for display at a user terminal by a regional expansion module according to some embodiments of the present disclosure.

FIG. 5A illustrates an example of a screen 500 that may be provided for display at the user terminal 202 indicating geographic areas suggested for on-line advertising. The screen 500 may include a suggestion field 502, a desirability field 504, a traffic field 506, a cost field 508, and a competition field 510.

The suggestion field 502 can selectively display geographic areas that are included in the market suggestion, the pertinent languages of the suggested geographic areas, and the translated key terms for each pertinent language. In some embodiments, the geographic areas are displayed in accordance with their respective score rankings, e.g., the most desirable geographic area is displayed first. In the example provided, a first suggested geographic area 520 is provided for display. In this example, the first suggested geographic area 520 is Germany. The user can elect to have the pertinent languages of the first suggested geographic area 520 displayed on the screen 500. In the illustrated example, the pertinent languages of Germany can be displayed below the first suggested geographic area 520. For instance, a first pertinent language 520*a* (English), a second pertinent language 520*b* (German), a third pertinent language 520*d* (Russian), and a fourth pertinent language 520*f* (Spanish) can be displayed. For each pertinent language, the user may be allowed to view the translated key term in the corresponding pertinent language. In the example provided, the user has elected to have the translated key term 520*c* in German, e.g., "kinderwagen," and the translated key term 520*e* in Russian displayed. It is appreciated that if a key term translates to more than one translated key term in a pertinent language, multiple translated key terms may be displayed to the user under the corresponding pertinent language.

The desirability field 504 can indicate the degree of desirability of advertising in a corresponding suggested geographic area (e.g., the area-specific score of a geographic area), the degree of desirability of advertising in a corresponding pertinent language of the suggested geographic area (e.g., the language-specific score of the pertinent language), or a degree of desirability of using a corresponding translated key term in an advertising campaign in the suggested geographic area (e.g., the term specific score of the translated key term). It is appreciated that the degree of desirability is based on the score corresponding to one of a geographic area, a pertinent language, or a translated key term. In some embodiments, the scores of a geographic area, a pertinent language, and/or a translated key term can be normalized on a scale of, for example, 0-1 or 0-100. In these embodiments, the degree of desirability can be displayed as a percentage or on a meter icon, as shown in FIG. 5. For example, a degree of desirability icon 522 associated with the first suggest geographic area 520 indicates that Germany has a high degree of desirability associated thereto. It is appreciated that the degree of desirability associated with geographic area, a pertinent language, or a translated key term may be displayed in any other suitable manner. For instance, the numerical score indicating the degree of desirability of a geographic area, a pertinent language, or a translated key term may be displayed to a user.

The traffic field 506 can indicate a traffic value indicative of a number of search queries that originate from the geographic area over a given period of time. In the example provided, when a traffic value, e.g., traffic value 530, is correlated to the first suggested geographic area 520, the traffic value may indicate the total number of searches performed for the translated key terms in each pertinent language of the geographic area. When a traffic value, e.g., traffic value 530*a* or 530*b*, is correlated to a pertinent language, the traffic value may indicate the total number of search queries originating from the geographic area containing any of the translated key terms in the corresponding pertinent language. For example, if a key term has two translated key terms corresponding to a particular pertinent language, the traffic value may correspond to the amount of search queries originating from the geographic area having either of the two translated terms contained therein. When a traffic value, e.g., traffic value 530*c*, is correlated to a translated key term, the traffic value may indicate the total number of search queries originating from the geographic area and containing the translated key term.

The cost field 508 can indicate a price associated with using one or more translated key terms in a search engine advertising campaign for search queries originating from a corresponding geographic area. The price may be, for example only, a price-per-click value. In the example provided, when a cost value, e.g., cost value 540, is correlated to the first suggested geographic area 520, the cost value may indicate a price-per-click value associated with the collection of translated key terms in each pertinent language of the geographic area. It is noted that the price-per-click value is only for searches originating from the geographic area. When a cost value, e.g., cost value 540*a* or cost value 540*b*, is correlated to a pertinent language, e.g., pertinent language 520*a* (English) or pertinent language 520*b* (German), the cost value may indicate an average price-per-click value associated with all the translated key terms in the corresponding pertinent language. For example, if a key term has two translated key terms corresponding to a particular pertinent language, the cost value may correspond to an average cost-per-click for the two translated terms contained therein. When a cost value, e.g., cost value 540*c*, is correlated to a translated key term, the cost value may indicate a price-per-click value associated with the translated key term in the geographic area.

The competition field 510 can indicate an amount of competitors that are using one or more of the translated key terms in the geographic area. In some embodiments, the competition values can be normalized, such that competition values can be between 0-1 or 0-100. In the example provided, when a competition value, e.g., competition value 550, is correlated to the first suggested geographic area 520, the competition value may indicate the amount of competitors using the collection of translated key terms in each pertinent language in advertising campaigns in the first suggested geographic area 520. When a competition value, e.g., competition value 550*a* or competition value 550*b*, is correlated to a pertinent language, the competition value may indicate an amount of competitors using the translated key terms in the corresponding pertinent language in an advertising campaign in the geographic area. When a competition value, e.g., competition value 550*c*, is correlated to a translated key term, the competition value may indicate the amount of competitors using the translated key term in an advertising campaign in the geographic area.

It is appreciated that the screen 500 provided in FIG. 5A is for example only and not intended to be limiting. It should be appreciated that the geographic areas, pertinent languages, translated key terms, and advertising statistics can be displayed in any suitable manner.

Figure 5B:
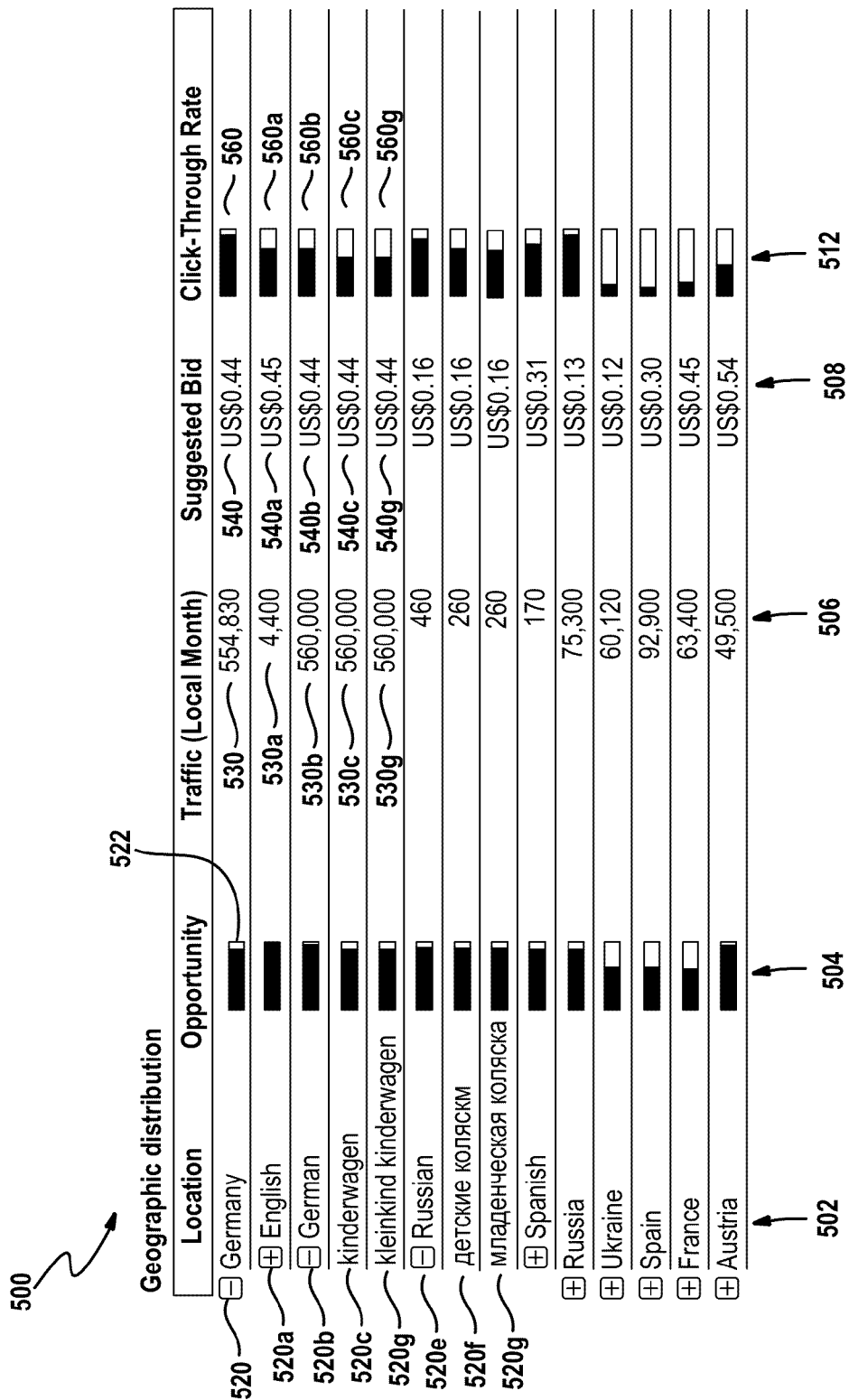

FIG. 5B provides another example of the screen 500 that may be provided for display at the user terminal 202 indicating geographic areas suggested for on-line advertising. As in the example provided in 5A, the screen 500 may include a suggestion field 502, a desirability field 504, a traffic field 506, and a cost field 508. In this example, the screen 500 may include a click-through rate field 512 in place of the competition field 510 (FIG. 5A). Furthermore, in the example of FIG. 5B a key term may have more than one translated key terms in a pertinent language corresponding thereto. For example, the translated key terms "kinderwagen" 520*c* and "kleinkind kinderwagen" 520*g* may both correspond to the key term "baby stroller."

In the illustrated example, the click-through rate field 512 can indicate a click-through rate of a translated key term or a plurality of translated key terms corresponding to a pertinent language or a geographic area. In some embodiments, the click-through rate can be a value that is between 0 and 1, and thus, can be displayed as a metered icon. In the example provided, when a click-through rate, e.g., competition value 550, is correlated to the first suggested geographic area 520, the click-through rate may indicate an average click-through rate for all of the translated key terms with respect to the first suggested geographic area 520. When a click-through rate, e.g., click-through rate 560*a* or click-through rate 560*b*, is correlated to a pertinent language, e.g., pertinent language 520*a*, the click-through rate may indicate an average click-through rate for all of the translated key terms corresponding to the pertinent language. When a click-through rate, e.g., click-through rates 560*c* or 560*g*, corresponds to a translated key term, e.g., 520*c* or 520*g*, the click-through rate indicates a click-through rate of the translated key term in the geographic area.

As should be appreciated, the examples of FIGS. 5A and 5B are provided for example only and are not intended to be limiting. It should be appreciated that that the geographic areas suggested for on-line advertising can be presented to a user in any suitable format.

Figure 6A:
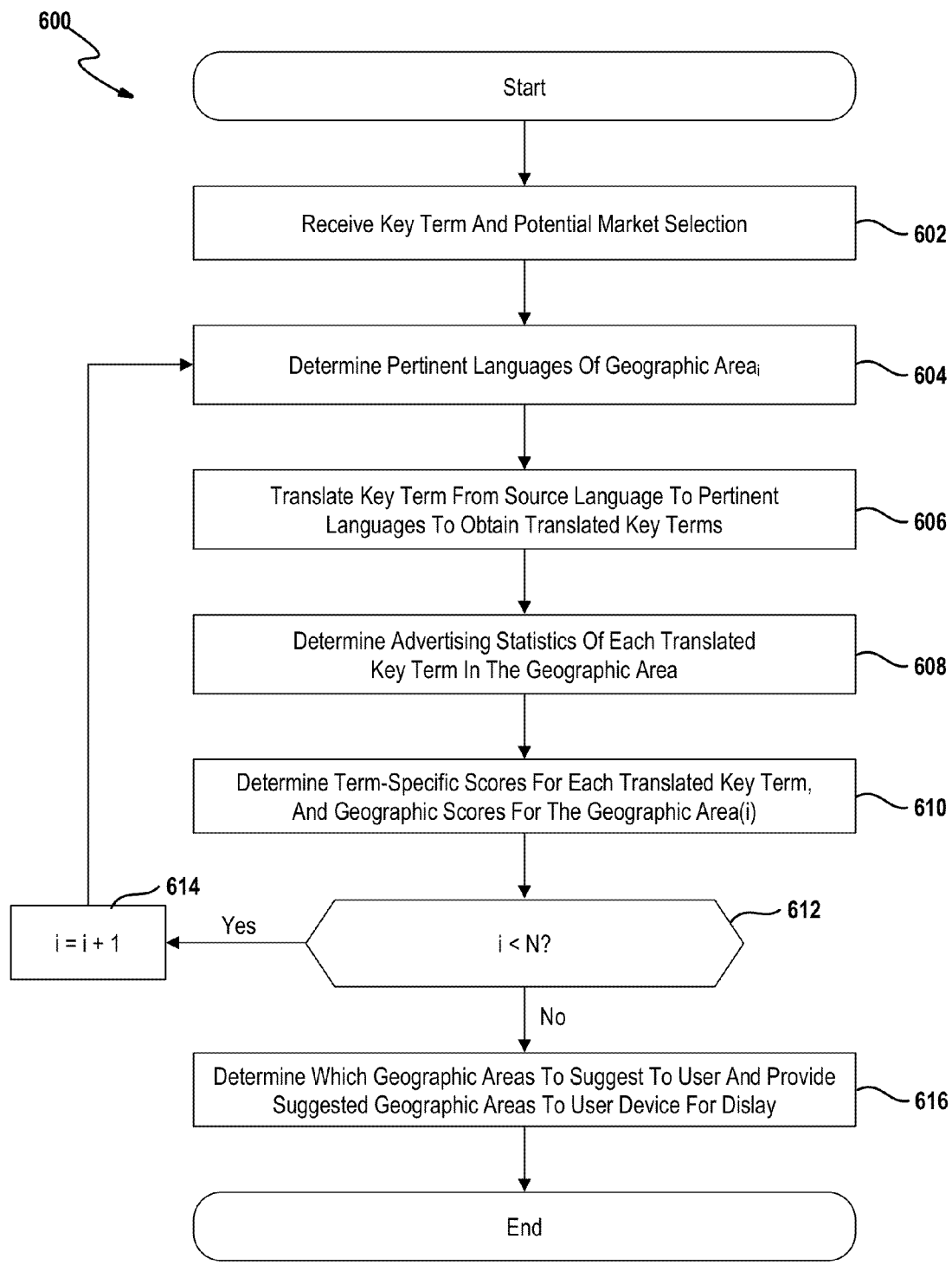
FIGS. 6A and 6B are flow charts illustrating example techniques for suggesting to an advertiser geographic areas in which to advertise in according to some embodiments of the present disclosure.

FIG. 6A illustrates an example technique 600 for determining a market suggestion that can be presented for display at a user terminal 202. At 602, the regional expansion module 200 can receive a key term and a potential market selection from a user. It is appreciated that "key term" includes a plurality of key terms, and each key term can be made up of one or more words. The potential market selection, as previously discussed, may indicate N geographic areas, where N is an integer greater than or equal to 1. As previously discussed, the potential market selection and the received key term indicate a key term that the user, e.g., advertiser, wants analyzed with respect to geographic areas in the potential market selection.

Based on the potential market selection and the received key term, the regional expansion module 200 determines whether to include each one of the N geographic areas in the market suggestion. For each geographic area, the regional expansion module 200 can determine the pertinent languages of the geographic area. In some embodiments, a counter, e.g., i, can be initialized to 0, to keep track of a geographic area currently being analyzed. At 604, the regional expansion module 200 can determine one or more pertinent languages of the ith geographic area of the potential market selection. As previously discussed, the pertinent languages of different geographic areas can be stored in a languages database 314.

For each one of the one or more pertinent languages of the one geographic area, the regional expansion module 200 can obtain a translation of the key term from the source language to the pertinent language to obtain a translated key term, as shown at 606. It is appreciated, as used herein, the term translated key term can include one or more words. Further, more than one translated key terms may be obtained by the regional expansion module 200. For each translated term, the regional expansion module 200 can determine advertising statistics corresponding to the translated key term and the one geographic area, as shown at 608. As discussed above, the advertising statistics can include (i) a traffic value corresponding to a number of search queries containing the translated key term that have been provided to a search engine during a period of time from the one geographic area, (ii) a cost value corresponding to a price associated with using the translated key term in a search engine advertising campaign for search queries originating from the one geographic area, and/or (iii) a competition value indicative of a number of entities that have registered the translated key term in other advertising campaigns in the geographic area.

At 610, the regional expansion module 200 can determine a score of the translated key term based on the advertising statistics. As previously mentioned, the score of a translated key term can indicate a degree of desirability of using the translated key term in the search engine advertising campaign in the one geographic area.

As mentioned, a term-specific score may be calculated for each of the translated key terms in each pertinent language of each geographic area. Thus, at 612, the regional expansion module 200 determines whether there are more geographic areas to analyze. If so, the counter, e.g., i, is incremented as shown at 614. If there are no more geographic areas to analyze, e.g., i=N, then the regional expansion module 200 can determine whether to suggest each of the geographic areas based on the scores of the translated key terms corresponding to the one or more pertinent languages of the geographic area. At 616, the regional expansion module 200 can provide for display each of the geographic areas that are to be suggested.

It is appreciated that the foregoing technique is provided for example only and not intended to limit the scope of the disclosure. Further, if the ordering of the steps disclosed in the technique is not essential, variations of the disclosed technique are contemplated and within the scope of the disclosure.

Figure 6B:
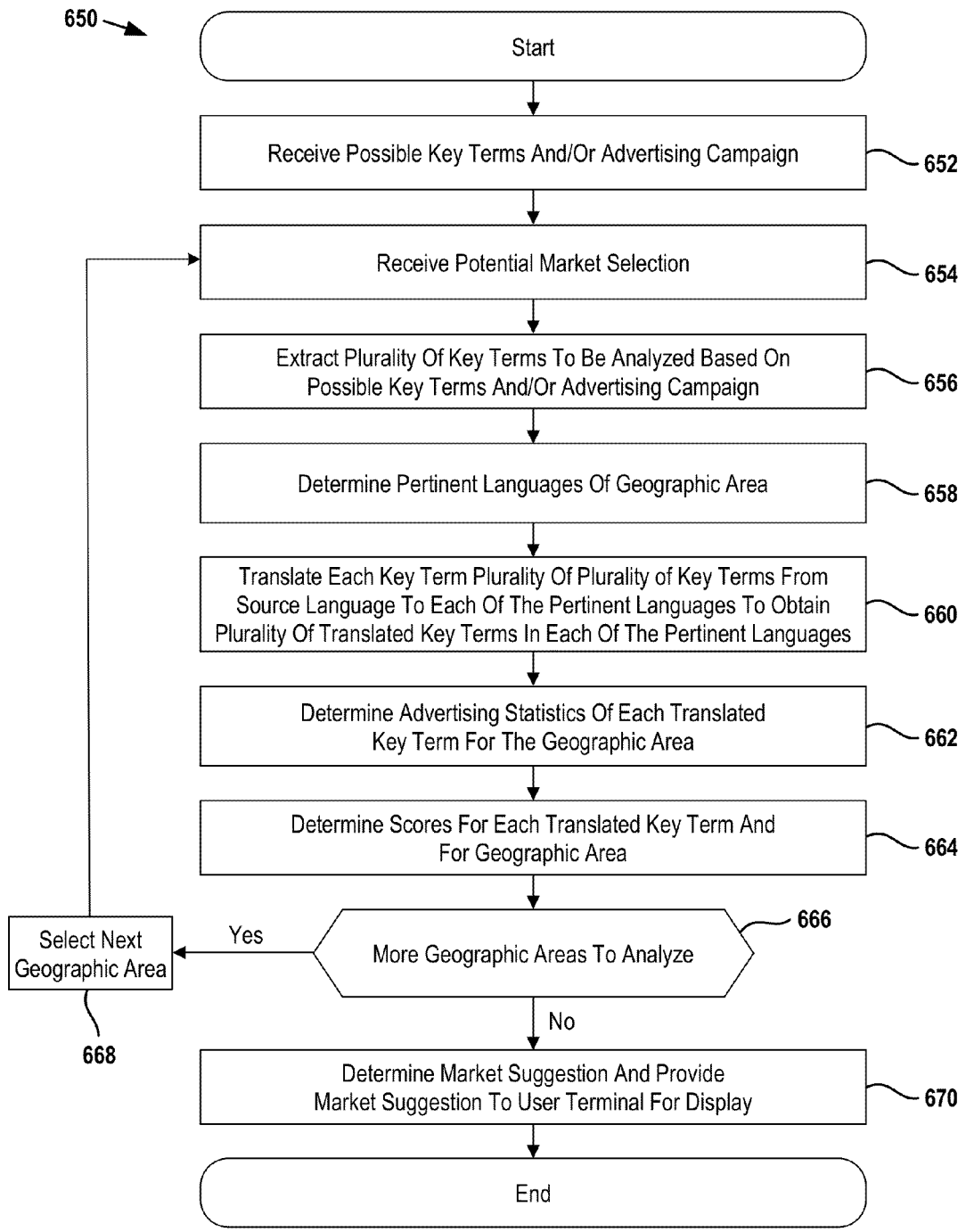

FIG. 6B illustrates another example technique 650 for determining a market suggestion that can be presented for display at a user terminal 202. At 652, the regional expansion module 200 can receive one or more potential key terms and/or a preexisting advertising campaign. At 654, the regional expansion module 200 can receive a potential market selection from a user. The potential market selection, as previously discussed, may indicate one or more geographic areas. The potential market selection, the received potential key terms, and the preexisting advertising campaign indicate the opportunity that the user wants analyzed with respect to geographic areas in the potential market selection.

At 656, the regional expansion module 200 can extract a plurality of key terms to be analyzed from the potential key terms and/or the preexisting advertising campaign. With respect to the preexisting advertising campaign, the regional expansion module 200 can extract possible key terms from the advertising creative of the advertising campaign, as well as from a website which is linked to by a hyperlink contained in the advertising creative. The key terms can be extracted from the advertising campaign in any suitable manner.

Based on the potential market selection and the plurality of key terms, the regional expansion module 200 determines whether to include each one of the one or more geographic areas in the market suggestion. At 658, the regional expansion module 200 can determine one or more pertinent languages of one of the geographic areas of the potential market selection. As previously discussed, the pertinent languages of different geographic areas can be stored in a languages database 314.

For each one of the one or more pertinent languages of the geographic area being analyzed, the regional expansion module 200 can obtain a translation of each key term of the plurality of key terms from the source language to the pertinent language to obtain a plurality of translated key terms in the pertinent language, as shown at 660. For each translated key term, the regional expansion module 200 can determine advertising statistics corresponding to the translated key term with respect to the geographic area being analyzed, as shown at 662. As discussed above, the advertising statistics of a translated key term with respect to the geographic area can include, but are not limited to: (i) a traffic value of the translated key term, (ii) a cost value of the translated key term, (iii) a click-through rate of the translated key term, and (iv) a competition value indicative of a number of entities that have registered the translated key term in other advertising campaigns in the geographic area.

At 664, the regional expansion module 200 can determine a term-specific score for each translated key term of the plurality of the translated key terms based on the advertising statistics of the geographic area being analyzed. As previously mentioned, the term-specific score of a translated key term can indicate a degree of desirability of using the translated key term in the search engine advertising campaign in the geographic area.

It is appreciated that a term-specific score may be calculated for each of the pluralities of translated key terms in each of the pertinent languages of the geographic area being analyzed. Furthermore, for each of the one or more pertinent languages of the geographic area, language-specific scores can be calculated. For example, a language-specific score of a pertinent language can be determined by averaging the term-specific scores of the plurality of translated key terms in the pertinent language. Similarly, an area-specific score for the geographic area can be determined by averaging the language-specific scores of one or more pertinent languages of the geographic area being analyzed or by averaging the term-specific scores of all of the translated key terms that correspond to the geographic area being analyzed.

At 666, the regional expansion module 200 determines whether there are more geographic areas to analyze. If so, the regional expansion module 200 determines the next geographic area of the one or more geographic areas to analyze, as shown at 668. If there are no more geographic areas to analyze, the regional expansion module 200 can determine, for each one of the one or more geographic areas, whether to the geographic areas in the market suggestion based on the scores of the translated key terms corresponding to the geographic area, as shown at 670. The regional expansion module 200 can provide the market suggestion for display at the user terminal 202.

It is appreciated that the foregoing technique 650 is provided for example only and not intended to limit the scope of the disclosure. Further, if the ordering of the steps disclosed in the technique is not essential, variations of the disclosed technique are contemplated and within the scope of the disclosure.

Figure 7:
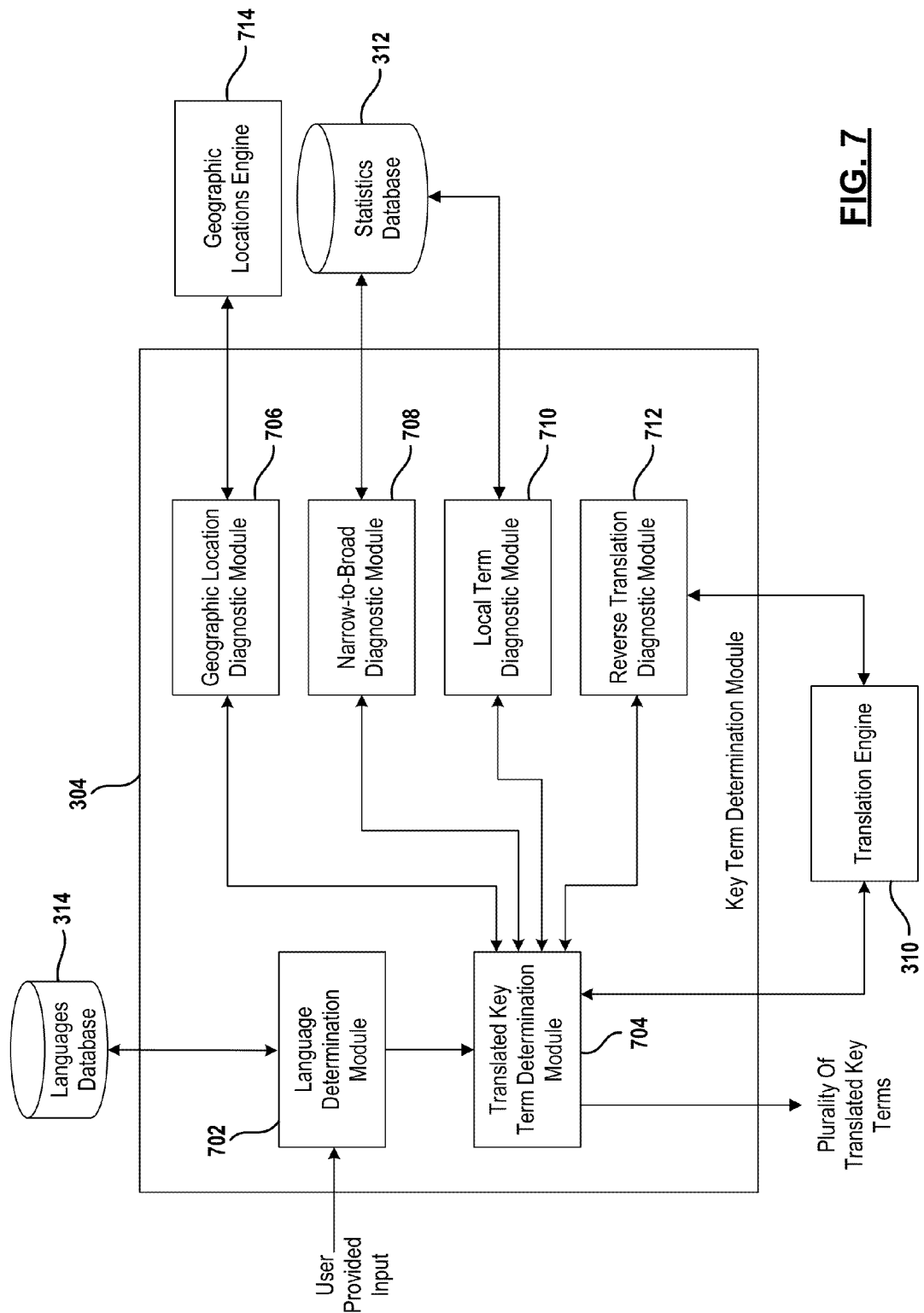
FIG. 7 is a block diagram illustrating example components of a key term determination module according to some embodiments of the present disclosure.

As discussed above, the key term determination module 304 may be configured to determine whether a translation of a key term from a source language to a target language is a poor translation. FIG. 7 illustrates an example of a key term determination module 304 configured to determine whether to adopt a potential translated key term as a translated key term. The key term determination module 304 may include a language determination module 702, a translated key term determination module 704, a geographic location diagnostic module 706, a narrow-to-broad diagnostic module 708, a local term diagnostic module 710, and a reverse translation diagnostic module 712.

The language determination module 702 can determine one or more target languages to which a key term is to be translated. As can be appreciated, a target language may be a pertinent language of a selected geographic area, which may be determined from the languages database 314. The language determination module 702 provides the one or more target languages to the translated key term determination module 704.

The translated key term determination module 704 can receive a key term to be translated from the user interface module 302 (FIG. 3), and one or more target languages from the language determination module 702. The translated key term determination module 704 can further obtain one or more potential translated keys terms based on the key term. In some embodiments, the translated key term determination module 704 may obtain a translation of the key term from the source language to the target language by providing the key term to a translation engine 310, which returns the one or more potential translated key terms in the target language.

The translated key term determination module 704 can adopt one or more of the potential translated key terms as the one or more translated key terms by performing diagnostics on the potential translated key terms. The diagnostics can include a geographic location diagnostic that can be performed by the geographic location diagnostic module 706, a narrow-to-broad diagnostic that can be performed by the narrow-to-broad diagnostic module 708, a local term diagnostic that can be performed by the local term diagnostic module 710, and a reverse translation diagnostic that can be performed by the reverse translation diagnostic module 712. Each of the diagnostics is described more fully below.

The geographic location diagnostic module 706 can analyze a key term and a potential translated key term to determine whether they both describe geographic locations, and if so, whether the key term and the translated key term have a geospatial correspondence. As can be appreciated, machine translations are sometimes inaccurate or inappropriate. One such inaccuracy that may occur is that one geographic location may be translated to a different geographic location. For example only, a key term of "London Trains" may be translated to "Amsterdem Treinin" in Dutch, which literally means "Amsterdam Trains" in English. The foregoing translation is inaccurate and should not be adopted as a translated key term. The geographic location diagnostic module 706 can be implemented to discard such translations.

To perform the geographic location diagnostic, the geographic location diagnostic module 706 receives a key term and one or more potential translated key terms. The geographic location diagnostic module 706 can parse a received key term to determine whether the key term includes one or more words describing a first geographic location. The geographic location diagnostic module 706 can provide one or more words of the key term to a geographic locations engine 714. The geographic locations engine 714 may be any service that receives one or more words or strings of numbers and determines a geographic location corresponding thereto. It is appreciated that the geographic locations engine 714 may define an application programming interface (API) that allows the geographic location diagnostic module 706 to provide the one or more words to the geographic locations engine 714. The geographic locations engine 714 can be configured to return an error code or any other type of indicator when the words do not describe a geographic location, or to return a first geographic location corresponding to the one or more words when the one or more words describe a geographic location.

The geographic location diagnostic module 706 can also parse a potential translated key term into one or more translated words. The geographic location diagnostic module 706 can provide the one or more translated words to the geographic locations engine 714 to determine whether one or more of the translated words describe a geographic location. If the one or more words describe a geographic location. If the one or more translated words describe a geographic location, the geographic locations engine 714 can return a second geographic location corresponding thereto. The geographic location diagnostic module 706 can compare the first geographic location with the second geographic location to determine whether the two geographic locations correspond to one another. It is appreciated that bounding boxes of a predetermined area can be defined around the first and second geographic locations to determine whether the two geographic areas overlap, and therefore correspond. If the two geographic locations overlap, the two geographic locations are said to geospatially correspond. If there is no overlap between the two geographic locations, e.g., London and Amsterdam, then the two geographic locations do not correspond, and the potential translated key term can be discarded.

Figure 8:
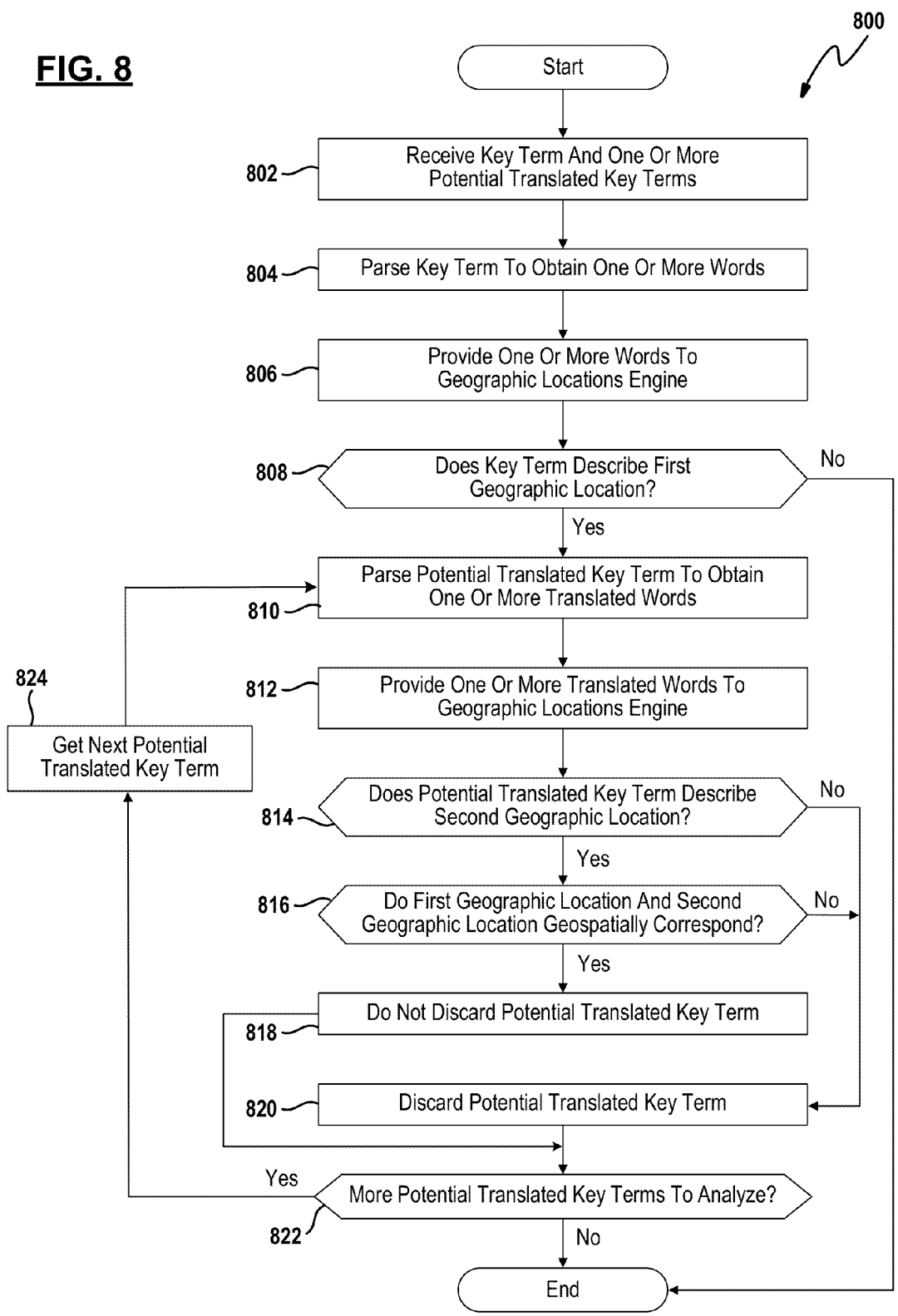
FIG. 8 is a flow chart illustrating an example of a technique for performing a geographic location diagnostic according to some embodiments of the present disclosure.

FIG. 8 illustrates an exemplary technique 800 for performing a geographic location diagnostic. At 802, the geographic location diagnostic module 706 can receive the key term and one or more potential translated key terms. The geographic location diagnostic module 706 can parse the key term into one or more words, as shown at 804. The geographic location diagnostic module 706 can then provide the one or more words to the geographic locations engine 714, as shown at

806. As previously discussed, the geographic locations engine 714 can be accessed using an API that provides applications access to the geographic locations engine 714. It is appreciated that the geographic locations engine 714 can return a geographic location corresponding to one or more of the one or more words provided, if the one or more words describe a geographic location. If the geographic locations engine 714 is unable to determine a geographic location corresponding to the one or more words, the geographic locations engine 714 may return an error code or another indicator that the geographic locations engine 714 was unable to determine a geographic location corresponding to the one or more provided words. At 808, the geographic location diagnostic module 706 determines whether the one or more words of the key term describe a first geographic location based on the response of the geographic locations engine 714. If the key term does not describe a first geographic location, then the geographic location diagnostic module 706 can stop executing. If, however, the key term does describe a first geographic location, then the geographic location diagnostic module 706 can further analyze the potential translated key terms.

At 810, the geographic location diagnostic module 706 parses one of the one or more potential translated key terms into one or more translated words. The geographic location diagnostic module 706 can provide the one or more translated words to the geographic locations engine 714, as shown at 812. As previously discussed, the geographic locations engine 714 can return a geographic location corresponding to the potential translated key term or an error code or indicator. At 814, the geographic location diagnostic module 706 determines whether the potential translated key term describes a second geographic location. If the potential translated key term does not describe a second geographic location, then the potential translated key term may be discarded, as shown at step 820. If the potential translated key term does describe a second geographic location, then the geographic location diagnostic module 706 can determine whether the first geographic location geospatially corresponds to the second geographic location, as shown at 816. As described above, two geographic locations can be determined to geospatially correspond, for example, if the two geographic locations overlap one another. If the first and second geographic locations geospatially correspond, then the potential translated key term is not discarded, as shown at 818. If the first and second geographic locations do not geospatially correspond, then the potential translated key term is discarded, as shown at 820.

At 822, the geographic location diagnostic module 706 can determine whether there are any remaining potential translated key terms to analyze. If there are remaining potential translated key terms, the geographic location diagnostic module 706 obtains the next potential translated key term, as shown at 824, and returns to 810. If there are no remaining potential translated key terms left to be analyzed, the geographic location diagnostic module 706 may stop executing and may return a list of potential translated key terms that were not discarded.

It is appreciated that the foregoing technique is provided for example only. Variations of the technique described above are contemplated and are within the scope of the disclosure.

Referring back to FIG. 7, the narrow-to-broad diagnostic module 708 determines whether the key term is more narrowly defined than any of the one or more potential translated key terms. For example, the term "laptop bag" may be machine translated to "cymka" in Russian, which literally translates to "bag" in English. This example translation may be considered a narrow-to-broad translation in that a "narrow" term (laptop bag) was translated to a "broad" term (bag). The narrow-to-broad diagnostic module 708 may utilize advertising statistics, such as corresponding traffic values for a key term and a potential translated key term, to determine whether the key term is more narrowly defined than the translated key term.

To perform the narrow-to-broad diagnostic, the narrow-to-broad diagnostic module 708 can obtain: (i) a traffic value for the key term, (ii) a traffic value for the potential translated key term, (iii) a traffic value for all search queries in the source language, and (iv) a traffic value for all search queries in the target language. It is noted that the traffic values can be constrained to include search queries originating from one or more specific geographic areas or can be unconstrained, such that the traffic values include search queries originating from anywhere in the world. The narrow-to-broad diagnostic module 708 can determine a first ratio of the traffic value of the key term to the traffic value of all search queries in the source language of the key term. The narrow-to-broad diagnostic module 708 can also determine a second ratio of the traffic value of the potential translated key term to the traffic value of all search queries in the target language of the potential translated key term. The narrow-to-broad diagnostic module 708 can compare the first ratio with the second ratio. If the second ratio is greater than the first ratio by more than a predetermined magnitude, e.g., 4 times greater, than the translation of the key term to the potential translated key term is considered to be a narrow-to-broad translation, and the potential translated key term can be discarded. If the second ratio is not greater than the first ratio by more than the predetermined magnitude, the potential translated key term is not considered to be a narrow-to-broad translation, and the potential translated key term may be further analyzed by the other diagnostic modules of the key term determination module 304.

Figure 9:
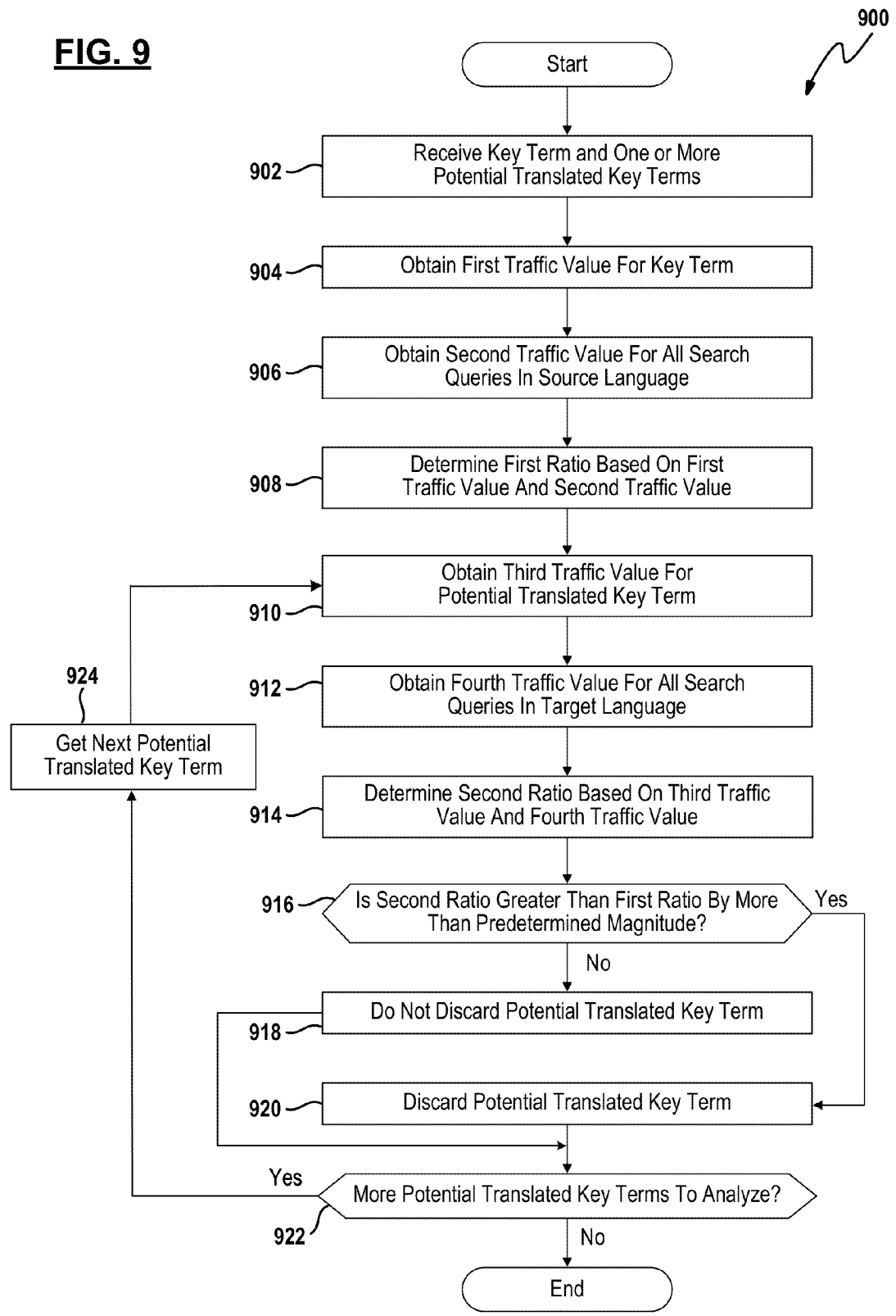
FIG. 9 is a flow chart illustrating an example of a technique for performing a narrow-to-broad diagnostic according to some embodiments of the present disclosure.

FIG. 9 illustrates an exemplary technique 900 for performing a narrow-to-broad translation diagnostic. At 902, the narrow-to-broad diagnostic module 708 receives the key term and one or more potential translated key terms. The narrow-to-broad diagnostic module 708 can then obtain a first traffic value for the key term, as shown at 904. The first traffic value, as well as other traffic values discussed herein, may be obtained from the statistics database 312. The first traffic value can be indicative of a first number of search queries that are provided to a search engine that contain the key term. The first traffic value, as well as the traffic values discussed below, can be constrained to one or more particular geographic areas or can encompass search queries originating from anywhere in the world. It is appreciated however, that if all of the traffic values, e.g., the first, second, third, and fourth traffic values, correspond to the same geographic area, the performance of the narrow-to-broad diagnostic may be improved.

At 906, the narrow-to-broad diagnostic module 708 can obtain a second traffic value indicating a total number of searches provided to the search engine in the source language. The narrow-to-broad diagnostic module 708 can then determine a first ratio of the first traffic value to the second traffic value, as shown at step 908.

For each of the potential translated key terms, the narrow-to-broad diagnostic module 708 can determine a second ratio for the potential translated key term. At 910, the narrow-to-broad diagnostic module 708 can obtain a third traffic value indicating the number of searches provided to the search engine which contain the potential translated key term that is currently being analyzed. At 912, the narrow-to-broad diagnostic module 708 can obtain a fourth traffic value indicating the total number of searches provided to the search engine in the target language. At 914, the narrow-to-broad diagnostic module 708 can determine a second ratio of the third traffic value to the fourth traffic value. It is appreciated that the second ratio is specific to the potential translated key term that is currently being analyzed.

At 916, the narrow-to-broad diagnostic module 708 can then compare the second ratio to the first ratio to determine if the second ratio is greater than the first ratio by more than a predetermined magnitude. If the second ratio is not greater than the first ratio by more than the predetermined magnitude, then the potential translated key term is not discarded, as shown at 918. If the second ratio is greater than the first ratio by more than the predetermined magnitude, then the potential translated key term can be discarded as being an overly broad translation, as shown at 920. At 922, the narrow-to-broad diagnostic module 708 can then determine whether there are any additional potential translated key terms to analyze. If there are more potential translated key terms to analyze, then the narrow-to-broad diagnostic module 708 obtains the next potential translated key term, as shown at 924, and returns to 910. If there are no remaining potential translated key terms, the narrow-to-broad diagnostic module 708 can stop executing.

It is appreciated that the foregoing technique is provided for example only. Variations of the technique described above are contemplated and are within the scope of the disclosure.

Referring back to FIG. 7, a local term diagnostic module 710 can be configured to perform a local term diagnostic on the key term. A key term is considered to be a local term if the key term has a special significance in a geographic area. For example, the term "stock car racing" may have more significance in the United States than throughout the rest of the world, as stock car racing is a popular American pastime but not popular throughout the rest of the world. The local term diagnostic module 710 utilizes advertising statistics for the key term in the source geographic area, which can be received via the user interface module 302, and advertising statistics of the key term in other geographic areas where the source language of the key term is considered a primary language. A language may be classified as a primary language of a geographic area based on various criteria. For example, if a language is the official language of a geographic area, then the language may be the primary language. Alternatively, the primary language of a geographic area can be determined based on the amount of search queries originating from the geographic area in a language in relation to search queries originating from the geographic areas in other languages. In the example of "stock car racing," India, England, and Canada may be considered geographic areas where English is a primary language.

The local term diagnostic module 710 can be configured to determine a first degree of significance of the key term with respect to a source geographic area and a second degree of significance of the key term with respect to one or more other geographic areas where the source language of the key term may be considered a primary language. The first degree of significance can be determined by calculating a first ratio of the traffic value of the key term in the source geographic area to a traffic value for all search queries in the source language that originate from the source geographic area. The second degree of significance can be determined by calculating a second ratio of the traffic value of the key term in one or more other geographic areas where the source language is the primary language to a traffic value for all search queries in the source language that originate from the one or more other geographic areas. The local term diagnostic module 710 can compare the first degree of significance with the second degree of significance to determine whether the key term has a local significance in the source geographic area. For example, if the first degree of significance is greater than the second degree of significance by more than a predetermined magnitude, e.g., 5 times greater, then the key term is determined to be a locally significant term.

Figure 10:
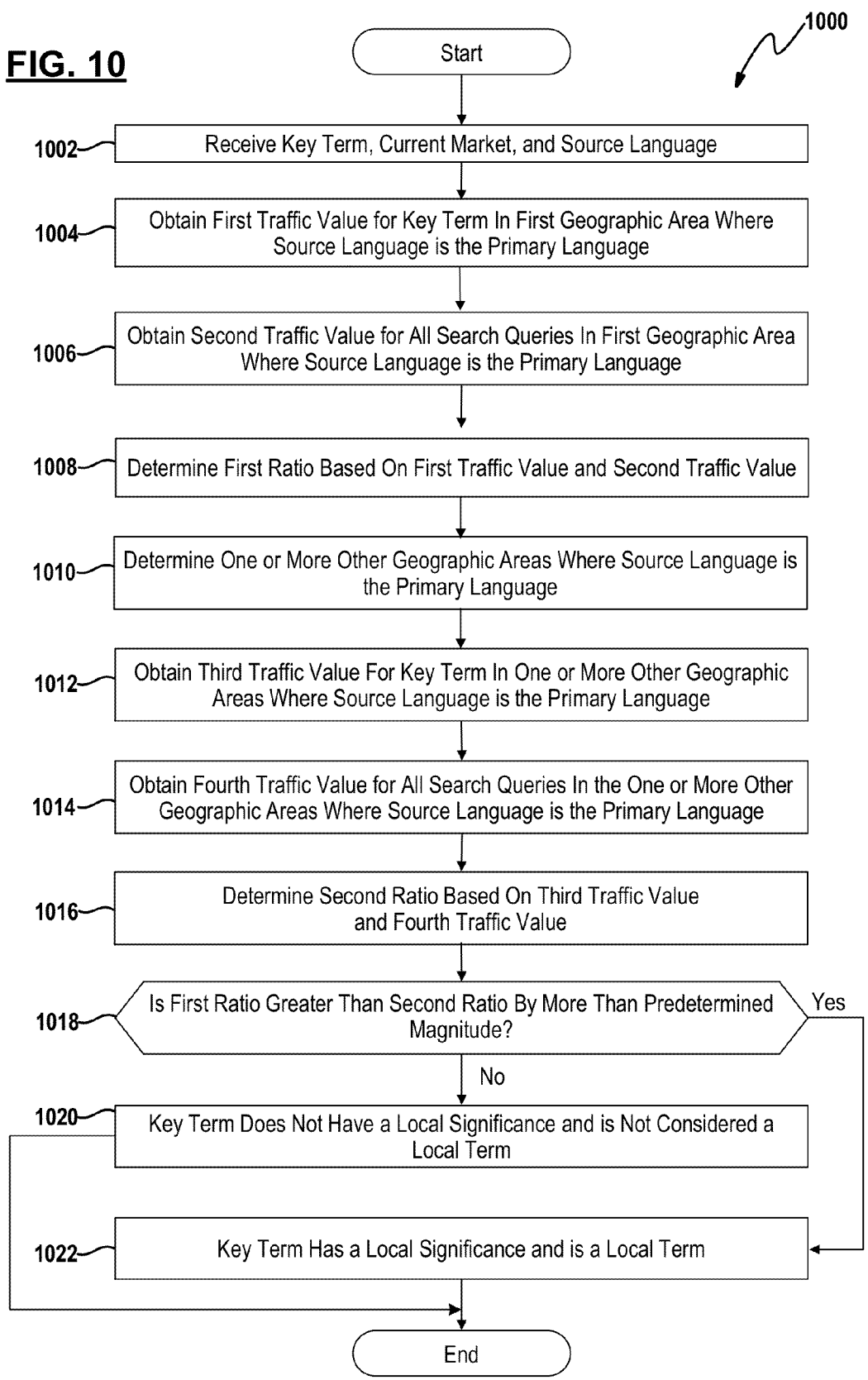
FIG. 10 is a flow chart illustrating an example of a technique for performing a local term diagnostic according to some embodiments of the present disclosure.

FIG. 10 illustrates an example technique 1000 for performing a local term diagnostic. At 1002, the local term diagnostic module 710 receives the key term, the current market information of the key term, and the language of the key term. As described above, the key term, the current market information and the language of the key term may be provided by a user to the regional expansion module 200, via the user interface module 302. At 1004, the local term diagnostic module 710 obtains a traffic value for the key term in a first geographic area. For example, the local term diagnostic module 710 can obtain a first traffic value for the key term in the geographic area in which the advertiser is currently advertising. The local term diagnostic module 710 can also obtain a second traffic value for all search queries originating from the geographic area, as shown at 1006. The local term diagnostic module 710 can determine a degree of significance with respect to the first geographic area, for example, by calculating a first ratio of the first traffic value to the second traffic value, as shown at 1008. The first ratio is indicative of a number of search queries that are directed to the key term in the geographic area in comparison to all search queries that originate from the geographic area.

The local term diagnostic module 710 can also determine other geographic areas where the language of the key term is a primary language. The local term diagnostic module 710 can determine the other geographic areas where the language of the key term is a primary language from the languages database 314, as shown at 1010. The local term diagnostic module 710 can then obtain a third traffic value for the key term in one or more of the other geographic areas, as shown at 1012, and a fourth traffic value for all search queries originating from the other geographic areas, as shown at 1014. Based on the third traffic value and the fourth traffic value, the local term diagnostic module 710 can determine a second degree of significance for the key term in the other geographic areas. For example, the local term diagnostic module 710 can determine a second ratio of the third traffic value to the fourth traffic value, as shown at 1016. It is noted that the first ratio and the second ratio should be determined in the same manner, so the comparisons thereof provide insightful data.

Once the first ratio and the second ratio have been determined, the local term diagnostic module 710 compares the first ratio to the second ratio, as shown at 1018. In comparing the first ratio with the second ratio, the local term diagnostic module 710 determines whether the first ratio is greater than the second ratio by more than a predetermined magnitude, e.g., 5. If the first ratio is not greater than the second ratio by more than the predetermined magnitude, then the key term is determined to not have a local significance and is not considered a local term, as shown at 1018. If the first ratio is greater than the second ratio by more than the predetermined magnitude, then the key term is determined to have a local significance and can be considered a local term, as shown at 1022. If a key term is determined to have a local significance, the potential translated key terms corresponding thereto may be discarded or may be identified as being translations of a key term having local significance.

It is appreciated that the foregoing technique is provided for example only. Variations of the technique described above are contemplated and are within the scope of the disclosure.

Referring back to FIG. 7, the reverse translation diagnostic module 712 can perform a reverse translation diagnostic. The reverse translation diagnostic module 712 can obtain, for each potential translated key term, a reverse translation of the potential translated key term from the target language to the source language. In some embodiments, the reverse translation diagnostic module 712 can provide the potential translated key term to the translation engine 310, which can return a machine translation of the potential translated key term from the target language to the source language. Each of the reverse translations is compared with the key term to determine if each respective reverse translation matches the key term. If a reverse translation matches the key term, the potential translated key term corresponding to the reverse translation is not discarded. If a reverse translation does not match the key term, the potential translated key term corresponding to the reverse translation is discarded. In some embodiments, the reverse translation diagnostic module 712 can be configured to override the discarding of the potential translated key term when all of the potential translated key terms are discarded because none of the reverse translations matched the key term. In these situations, all of the potential translated key terms are kept.

Figure 11:
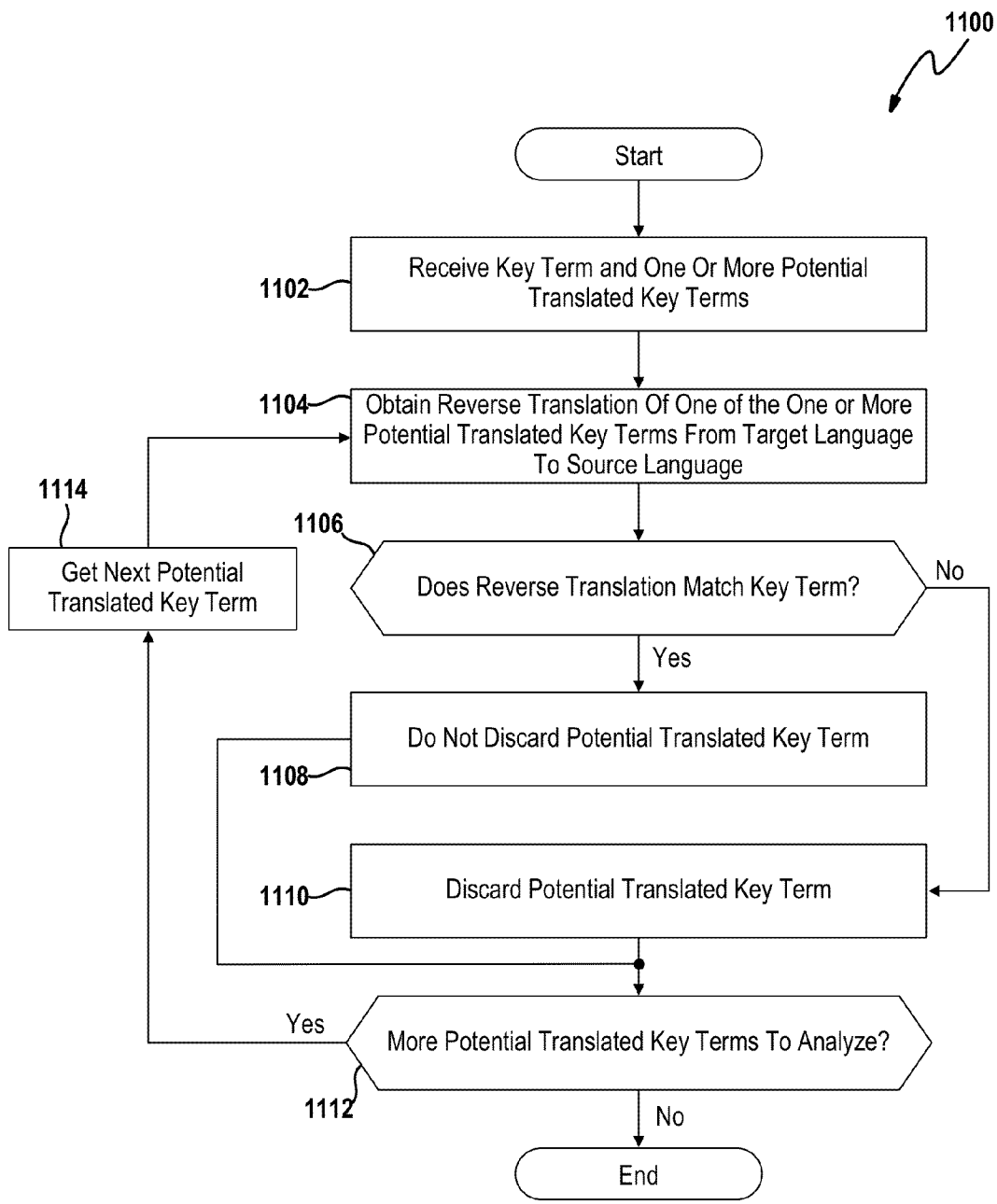
FIG. 11 is a flow chart illustrating an example of a technique for performing a reverse translation diagnostic according to some embodiments of the present disclosure.

FIG. 11 illustrates an example of a technique 1100 for performing a reverse translation diagnostic. The reverse translation diagnostic module 712 receives the key term and one or more potential translated key terms, as shown at 1102. For each one of the one or more potential translated key terms, the reverse translation diagnostic module 712 can obtain a reverse translation of the potential translated key term from the target language to the source language, as shown at 1104. In some embodiments, the reverse translation diagnostic module 712 provides a potential translated key term to the translation engine 310 and requests that the potential translated key term be translated from the target language to the source language. For each one of the potential translated key terms, the reverse translation diagnostic module 712 receives a reverse translation corresponding to the potential translated key term, and determines whether the reverse translation matches the key term, as shown at 1106.

If the reverse translation matches the key term at 1106, the reverse translation diagnostic module 712 does not discard the corresponding potential translated key term, as shown at 1108. If the reverse translation does not match the key term, then the reverse translation diagnostic module 712 discards the corresponding potential translated key term, as shown at 1110. At 1112, the reverse translation diagnostic module 712 can determine whether there are any further potential translated key terms left to analyze. If there are more potential translated key terms left to analyze, the reverse translation diagnostic module 712 obtains the next potential translated key term, as shown at 1114. If there are no remaining potential translated key terms left to analyze, the reverse translation diagnostic module 712 may stop executing. As noted above, in some embodiments, if the reverse translation diagnostic module 712 determines that all of the potential translated key terms are to be discarded, i.e., none of the reverse translations matched the key term, the reverse translation diagnostic module 712 can keep all of the potential translated key terms, rather than discarding all of the potential translated key terms.

It is appreciated that the foregoing technique is provided for example only. Variations of the technique described above are contemplated and are within the scope of the disclosure.

Referring back to FIG. 7, the translated key term determination module 704 can selectively adopt a potential translated key term as an acceptable translation based on the geographic location diagnostic, the narrow-to-broad diagnostic, the local term diagnostic, and/or the reverse translation diagnostic. For example, the translated key term determination module 704 may provide the one or more potential translated key terms to the geographic location diagnostic module 706. The geographic location diagnostic module 706 can then perform the geographic location diagnostic, and in doing so, may discard one or more of the potential translated key terms. The non-discarded potential translated key terms can be returned to the translated key term determination module 704.

The translated key term determination module 704 can provide the potential translated key terms that were not discarded by the geographic location diagnostic module 706 to the reverse translation diagnostic module 712. The reverse translation diagnostic module 712 can perform a reverse translation diagnostic on the received potential translated key terms, and may discard one or more of the received potential translated key terms. The remaining potential translated key terms, e.g., the potential translated key terms not discarded by either the reverse translation diagnostic module 712 or the geographic location diagnostic module 706, can be returned to the translated key term determination module 704.

The translated key term determination module 704 can then provide the key term to the local term diagnostic module 710, which may perform a local term diagnostic on the key term. If the key term is not a local term, the remaining potential translated key terms can be provided to the narrow-to-broad diagnostic module 708. The narrow-to-broad diagnostic module 708 can perform the narrow-to-broad diagnostic on the remaining potential translated key terms, and may discard some of the remaining potential translated key terms when determined to be narrow-to-broad translations.

After the diagnostics have been performed, the remaining potential translated key terms can be adopted as translated key terms. It is appreciated that the foregoing sequence is not intended to be limiting and the diagnostics can be performed in any other suitable manner. For example, the diagnostics can be performed concurrently, such that after the diagnostics are preformed, any remaining potential translated key terms may be selectively adopted as translated key terms.

Further, additional diagnostics may be performed by the key term determination module 304. For instance, the key term can be analyzed to determine if the key term is a trade name. The key term can be used to provide a query to a trade name database (not shown) that stores any known trade names such as known trademarks, service marks, and/or business names. If the key term is determined to be a trade name, then the key term determination module 304 can obtain a transliteration of the key term in the target language rather than a translation of the key term.

It is appreciated that the foregoing technique is provided for example and not intended to limit the scope of the disclosure. Further, the ordering of the steps disclosed in the technique is not essential and variations of the disclosed technique are contemplated and within the scope of the disclosure.

In the techniques disclosed above the translated key term determination module 704 is described as discarding potential translated key terms based on individual diagnostics. It should be appreciated that in some embodiments, the translated key term determination module 704 can be configured to determine whether to adopt a potential translated key term as a translated key term based on the collection of diagnostics as well. In these embodiments, the geographic location diagnostic module 706, the narrow-to-broad diagnostic module 708, the local term diagnostic module 710, and the reverse translation diagnostic module 712 can each be configured to generate translation scores for each potential translated key term. The translated key term determination module 704 can determine whether to adopt or discard a potential translated key term based on the translation scores provided from the diagnostic modules 706, 708, 710, and 712. For example, the translated key term determination module 704 can aggregate or average the translation scores corresponding to a potential translated key term, and determine whether to adopt or discard the potential translated key term based on whether the aggregated or averaged translation score of the potential translated key term exceeds a predetermined threshold.

In these embodiments, each diagnostic module 706, 708, 710, and 712 can be configured to assign a translation score of a potential translated key term based on the diagnostic performed. For instance, when the geographic location diagnostic module 706 determines that a potential translated key term geospatially corresponds to the key term, the geographic location diagnostic module 706 may assign a relatively high translation score to the potential translated key term. When the geographic location diagnostic module 706 determines that the potential translated key term does not geospatially correspond to the key term, the geographic location diagnostic module 706 may assign a relatively low translation to the potential translated key term. When the geographic location diagnostic module 706 determines that the potential translated key term and/or the key term do not describe a geographic area, the geographic location diagnostic module 706 may assign a relatively neutral score the potential translated key term.

Similarly, the narrow-to-broad diagnostic module 708 can assign a translation score to a potential translated key term. For instance, when the narrow-to-broad diagnostic module 708 determines that a potential translated key term is much broader than the key term, the narrow-to-broad diagnostic module 708 may assign a relatively low translation score can be assigned to the potential translated key term. When, however, the potential translated key term is not an overly broad translation, the narrow-to-broad diagnostic module 708 may assign a relatively high score to the potential translated key term.

Similarly, the reverse translation diagnostic module 712 can assign a translation score to a potential translated key term. For instance, when the reverse translation diagnostic module 712 determines that a reverse translation of a potential translated key term matches the key term, the reverse translation diagnostic module 712 can assign a relatively high translation score to the potential translated key term. If, however, the reverse translation does not match the key term, the reverse translation diagnostic module 712 can assign a relatively low translation score to the potential translated key term.

In some embodiments, the local term diagnostic module 710 can assign a translation score to all of the potential translated key terms based on whether the key term is a local term. For instance, when the local term diagnostic module 710 determines that the key term is a local term, then the local term diagnostic module 710 can assign a relatively low translation score to all of the potential translated key terms. If the local term diagnostic module 710 determines that the key term is not a local term, the local term diagnostic module 710 can assign can assign a relatively high translation score to all of the potential translated key terms.

The translated key term determination module 704 can receive the translation scores of each potential translated key term and determine whether to discard or adopt the potential translated key term based on the received translation scores. Furthermore, the translated key term determination module 704 can assign weights to each of the translation scores from each diagnostic module 706, 708, 710, and 712. For instance, greater weight may be given to translation scores received from the reverse translation diagnostic module 712, and lesser weight may be given to translation scores received from the local term diagnostic module 710.

It is appreciated that the foregoing technique is provided for example and not intended to limit the scope of the disclosure. Furthermore, it should be appreciated that the values of the translation scores can be determined in any suitable manner.

The foregoing description of embodiments has been provided for purposes of illustration and description. It is not intended to be exhaustive or to limit the disclosure, and other embodiments are within the scope of the following claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped)

and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computing system comprising:
one or more processing devices;
one or more storage devices storing instructions that can be executed by the one or more processing devices, the storage devices including a user interface module, a language determination module, a translated key term determination module, a geographic location diagnostic module, a narrow-to-broad diagnostic module, a reverse translation diagnostic module, and a local term diagnostic module, wherein
the user interface module is configured to receive a key term including one or more words in a source language;
the language determination module is configured to determine a target language to which the key term is to be translated;
the translated key term determination module is configured to obtain one or more potential translated keys term by obtaining a translation of the key term from the source language to the target language;
the geographic location diagnostic module performs a geographic location diagnostic for each one of the one or more potential translated key terms, the geographic location diagnostic module being configured to: (i) determine whether the key term describes a first geographic location, (ii) determine whether the one potential translated key term describes a second geographic location, and (iii) when the key term describes the first geographic location and the one potential translated key term describes the second geographic location, determine whether the second geographic location geospatially corresponds to the first geographic location;

the narrow-to-broad diagnostic module performs a narrow-to-broad diagnostic for each one of the one or more potential translated key terms, the narrow-to-broad diagnostic module being configured to: (i) determine a first traffic value corresponding to a first number of search queries containing the key term that are provided to a search engine, (ii) determine a second traffic value corresponding to a second number of total search queries provided to the search engine in the source language, (iii) determine a third traffic value corresponding to a third number of search queries containing the one potential translated key term that are provided to a search engine, (iv) determine a fourth traffic value corresponding to a fourth number of total search queries which were provided to the search engine in the target language, (v) determine a first ratio of the first traffic value to the second traffic value, (vi) determine a second ratio of the third traffic value to the fourth traffic value, and (vii) discard the potential translated key term when the second ratio is greater than the first ratio by more than a predetermined magnitude;

the local term diagnostic module is configured to perform a local term diagnostic for the key term by: (i) determining a first degree of significance of the key term in a first geographic area where the source language is a primary language, (ii) determining a second degree of significance for the key term in one or more other geographic areas where the source language is a primary language, and (iii) comparing the first degree of significance with the second degree of significance; and the reverse translation diagnostic module performs a reverse translation diagnostic, the reverse translation diagnostic module being configured to: (i) obtain one or more reverse translations of the one or more potential translated key terms from the target language to the source language, (ii) compare each one of the one or more reverse translations with the key term, and (iii) when at least one of the reverse translations match the key term, discard the potential translated key terms having reverse translations that do not match the key term, and wherein the key term determination module is further configured to selectively adopt, for each one of the one or more potential translated key terms, the one potential translated key term as a translated key term based on the geographic location diagnostic, the narrow-to-broad diagnostic, the local term diagnostic, and the reverse translation diagnostic.

2. A computer-implemented method for verifying machine translations comprising:

receiving, at a computing device having one or more processors, a key term including one or more words in a source language;

determining, at the computing device, a target language to which the key term is to be translated;

obtaining, at the computing device, one or more potential translated keys terms by obtaining a machine translation of the key term from the source language to the target language; and determining, at the computing device, whether to adopt any of the one or more potential translated key terms as a translated key term by:

a) performing, at a geographic location diagnostic module, a geographic location diagnostic for each one of the one or more potential translated key terms by: (i) determining whether the key term describes a first geographic location, (ii) determining whether the one potential translated key term describes a second geographic location, and (iii) when the key term describes the first geographic location and the one potential translated key term describes the second geographic location, determining whether the second geographic location geospatially corresponds to the first geographic location, b) performing, at a narrow-to-broad diagnostic module, a narrow-to-broad diagnostic for each one of the one or more potential translated key terms by determining whether the key term is more narrowly defined than the one potential translated key term, based on traffic values for the key term as compared to traffic values for the potential translated key term, c) performing, at a local term diagnostic module, a local term diagnostic for the key term by: (i) determining a first degree of significance of the key term in a first geographic area where the source language is a primary language which is indicative of a number of search queries that are directed to the key term in the first geographic area in comparison to all search queries that originate from the geographic area, (ii) determining a second degree of significance for the key term in one or more other geographic areas where the source language is a primary language which is indicative of a number of search queries that are directed to the key term in the one or more other geographic areas in comparison to all search queries that originate from the one or more other geographic areas, and (iii) comparing the first degree of significance with the second degree of significance, and d) for each one of the one or more potential translated key terms, selectively adopting the one potential translated key term as an acceptable translation based on at least one of the geographic location diagnostic, the narrow-to-broad diagnostic, and the local term diagnostic.

3. The method of claim 2, wherein determining whether the key term is more narrowly defined than the one potential translated key term comprises:

determining a first traffic value corresponding to a first number of search queries which contain the key term in the source language that were provided on a search engine;

determining a second traffic value corresponding to a second number of total search queries provided to the search engine in the source language;

determining a third traffic value corresponding to a third number of search queries which contain the one potential translated key term that were provided to search engine;

determining a fourth traffic value corresponding to a fourth number of total search queries which were provided to the search engine in the target language; and determining whether to discard the one potential key term based on the first traffic value, the second traffic value, the third traffic value, and the fourth traffic value.

4. The method of claim 3, further comprising determining a first ratio of the first traffic value to the second traffic value and a second ratio of the third traffic value to the fourth traffic value.

5. The method of claim 4, further comprising discarding the potential translated key term when the second ratio is greater than the first ratio by more than a predetermined magnitude.

6. The method of claim 2, wherein determining whether to adopt any of the one or more potential translated key terms as the translated key term includes performing, at a reverse translation diagnostic module, a reverse translation diagnostic by:
obtaining one or more reverse translations of the one or more potential translated key terms from the target language to the source language, and comparing each one of the one or more reverse translations with the key term; and
when at least one of the reverse translations match the key term, discarding any of the potential translated key terms having reverse translations that do not match the key term.

7. The method of claim 6, further comprising when none of the reverse translations match the key term, discarding none of the potential translated key terms.

8. The method of claim 2, wherein the one potential translated key term is selectively adopted as the acceptable translation when the second geographic location geospatially corresponds to the first geographic location.

9. The method of claim 2 wherein the second geographic location geospatially corresponds to the first geographic location when the second geographic location and the first geographic location overlap.

10. The method of claim 2, wherein the local term diagnostic includes:
determining the first degree of significance by determining a first ratio of a first number of search queries containing the key term and originating from the first geographic area to a second number of search queries containing any terms and originating from the first geographic area; and
determining the second degree of significance by determining a second ratio of a third number of search queries containing the key term and originating from the one or more other geographic areas to a fourth number of search queries containing any terms and originating from the one or more other geographic areas.

11. The method of claim 10 wherein the key term is determined to be locally significant to the first geographic area when the first ratio is greater than the second ratio by a predetermined magnitude.

12. A computing system comprising:
one or more processing devices;
one or more storage devices storing instructions that can be executed by the one or more processing devices, the storage devices including a user interface module, a language determination module, a translated key term determination module, a geographic location diagnostic module, a narrow-to-broad diagnostic module, and a local term diagnostic module, wherein:
a the user interface module is configured to receive a key term including one or more words in a source language;
a the language determination module is configured to determine a target language to which the key term is to be translated;
the translated key term determination module is configured to obtain one or more potential translated keys term by obtaining a translation of the key term from the source language to the target language;
the geographic location diagnostic module performs a geographic location diagnostic for each one of the one or more potential translated key terms, the geographic location diagnostic module being configured to: (i) determine whether the key term describes a first geographic location, (ii) determine whether the one potential translated key term describes a second geographic location, and (iii) when the key term describes the first geographic location and the one potential translated key term describes the second geographic location, determine whether the second geographic location geospatially corresponds to the first geographic location;
the narrow-to-broad diagnostic module performs a narrow-to-broad diagnostic for each one of the one or more potential translated key terms, the narrow-to-broad diagnostic module being configured to determine whether the key term is more narrowly defined than the one potential translated key term, based on traffic values for the key term as compared to traffic values for the potential translated key term; and
the local term diagnostic module performs a local term diagnostic for the key term, the local term diagnostic module being configured to: (i) determine a first degree of significance of the key term in a first geographic area where the source language is a primary language which is indicative of a number of search queries that are directed to the key term in the first geographic area in comparison to all search queries that originate from the geographic area, (ii) determine a second degree of significance for the key term in one or more other geographic areas where the source language is a primary language which is indicative of a number of search queries that are directed to the key term in the one or more other geographic areas in comparison to all search queries that originate from the one or more other geographic areas, and (iii) compare the first degree of significance with the second degree of significance,
and wherein the key term determination module is further configured to selectively adopt, for each one of the one or more potential translated key terms, the one potential translated key term as a translated key term based on at least one of the geographic location diagnostic, the narrow-to-broad diagnostic, and the local term diagnostic.

13. The system of claim 12, wherein the narrow-to-broad diagnostic module is further configured to:
determine a first traffic value corresponding to a first number of search queries containing the key term that are provided to a search engine;
determine a second traffic value corresponding to a second number of total search queries provided to the search engine in the source language;
determine a third traffic value corresponding to a third number of search queries containing the one potential translated key term that are provided to a search engine;
determine a fourth traffic value corresponding to a fourth number of total search queries which were provided to the search engine in the target language; and
determine whether to discard the one potential key term based on the first traffic value, the second traffic value, the third traffic value, and the fourth traffic value.

14. The system of claim 13, wherein narrow-to-broad diagnostic module is further configured to determine a first ratio of the first traffic value to the second traffic value and a second ratio of the third traffic value to the fourth traffic value and to discard the potential translated key term when the second ratio is greater than the first ratio by more than a predetermined magnitude.

15. The system of claim 12, further comprising a reverse translation diagnostic module that performs a reverse translation diagnostic, the reverse translation diagnostic module being configured to: (i) obtain one or more reverse translations of the one or more potential translated key terms from the target language to the source language, (ii) compare each one of the one or more reverse translations with the key term, and (iii) when at least one of the reverse translations match the key term, discard the potential translated key terms having reverse translations that do not match the key term.

16. The system of claim 15, wherein the reverse translation diagnostic module is configured to discard none of the potential translated key terms when none of the reverse translations match the key term.

17. The system of claim 12, wherein the geographic location diagnostic module is configured to determine that the second geographic location geospatially corresponds to the first geographic location when the second geographic location and the first geographic location overlap.

18. The system of claim 17, wherein the geographic location diagnostic module discards the one potential translated key term when the second geographic location does not geospatially correspond to the first geographic location.

19. The system of claim 12, wherein the local term diagnostic module is configured to: determine the first degree of significance by determining a first ratio of a first number of search queries containing the key term and originating from the first geographic area to a second number of search queries containing any terms and originating from the first geographic area; and determine the second degree of significance by determining a second ratio of a third number of search queries containing the key term and originating from the one or more other geographic areas to a fourth number of search queries containing any terms and originating from the one or more other geographic areas.

20. The system of claim 19 wherein the local term diagnostic module is configured to determine that a key term is locally significant to the first region when the first ratio is greater than the second ratio by more than a predetermined magnitude.

\* \* \* \* \*